(12) United States Patent
Takeuchi et al.

(10) Patent No.: US 7,321,463 B2
(45) Date of Patent: Jan. 22, 2008

(54) IN-LINE OPTICAL ISOLATOR

(75) Inventors: Yoshiaki Takeuchi, Tokyo (JP); Masaru Watanabe, Tokyo (JP); Ikuo Fukuzaki, Tokyo (JP)

(73) Assignee: Osaki Electric Co., Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 10/558,924

(22) PCT Filed: Jun. 23, 2004

(86) PCT No.: PCT/JP2004/008802

§ 371 (c)(1),
(2), (4) Date: Dec. 1, 2005

(87) PCT Pub. No.: WO2005/001548

PCT Pub. Date: Jan. 6, 2005

(65) Prior Publication Data

US 2006/0268405 A1    Nov. 30, 2006

(30) Foreign Application Priority Data

Jun. 27, 2003  (JP) ............................. 2003-185216
Feb. 16, 2004  (JP) ............................. 2004-037930

(51) Int. Cl.
G02B 5/30       (2006.01)
G02B 27/28      (2006.01)

(52) U.S. Cl. ..................................... 359/495
(58) Field of Classification Search ................ 359/495
See application file for complete search history.

(56) References Cited

U.S. PATENT DOCUMENTS 5,033,830 A * 7/1991 Jameson .................... 359/484
5,499,132 A * 3/1996 Tojo et al. .................. 359/281
5,546,219 A * 8/1996 Iida ........................... 359/281
5,574,595 A * 11/1996 Kurata et al. ............... 359/484
6,249,619 B1 * 6/2001 Bergmann et al. ........... 385/11
6,359,733 B1 * 3/2002 Iwatsuka et al. ............ 359/500
6,922,281 B2 * 7/2005 Pan et al. ................. 359/341.1
7,044,660 B2 * 5/2006 Pan et al. ..................... 385/93
7,130,121 B2 * 10/2006 Pan et al. ................... 359/494
2003/0151811 A1 * 8/2003 Helbing ..................... 359/484
2006/0268405 A1 * 11/2006 Takeuchi et al. ........... 359/483

FOREIGN PATENT DOCUMENTS

JP        06-067118        3/1994
JP        07049467 A  *    2/1995
JP        2005017904 A  *  1/2005
JP        2005227659 A  *  8/2005

* cited by examiner

Primary Examiner—Deandra M Hughes
(74) Attorney, Agent, or Firm—Flynn, Thiel, Boutell & Tanis, P.C.

(57) ABSTRACT

In conventional optical isolators, an optical signal is dispersed by polarization or the characteristics are varied by heat generation in a garnet crystal. According to the invention, the crystal optical axis (3c) of rutile crystal (3) is oriented so that the separation directions of the ordinary ray (O) and the extraordinary ray (E) are perpendicular to the plane including the optical axes of optical fibers (10, 11). Furthermore, the focusing central optical axis (6c) of a focusing rod lens (6) is arranged parallel with optical axes of the optical fibers (10, 11) and at a substantially equal distance from the four rays, i.e. the ordinary ray (O) and the extraordinary ray (E) propagating along the optical axis of the optical fiber (10) and the ordinary ray (O) and the extraordinary ray (E) propagating along the optical axis of the optical fiber (11). An air gap (7) of about 200 [μm] is provided, as a heat insulating means, between the focusing rod lens (6) and a magnetized garnet crystal (8).

3 Claims, 17 Drawing Sheets

IN-LINE OPTICAL ISOLATOR

FIELD OF TECHNOLOGY

The present invention relates to optical isolators that are used to isolate transmission of optical signals in the reverse direction in optical signal paths such as optical communication systems and optical sensor systems, in particular, in-line optical isolators in which optical devices are arranged in a straight line, or in-line optical isolators in which multiple optical isolator functions are integrated.

BACKGROUND OF THE INVENTION

In general, in-line optical isolators are used in optical communication systems and optical sensor systems to prevent the reflected optical signal of transmitted optical signals from being input into the signal processing parts of optical transmission equipment. Because the state of polarization of transmitted optical signals normally does not stay constant, a polarization-independent optical isolator is required.

Conventionally, optical isolators of this type include, for example, a polarization-independent optical isolator disclosed in Patent Literature 1 below. This polarization-independent optical isolator uses a birefringent plate to isolate transmission in the reverse direction, and is comprised of, arranged in the stated order, a birefringent plate, a first and a second reversible rotating means, an irreversible rotating means, a lens and a concave mirror.

In this configuration, an input optical signal, which enters from the input optical fiber and propagates in the forward direction, enters the birefringent plate and is separated into an ordinary ray (O ray) and an extraordinary ray (E ray) in a plane including the optical axes of the input optical fiber and the output optical fiber. The separated rays then pass through the first reversible rotating means, but it does not affect the rotating angle of the polarizing directions of the rays. Next, the rays enter the Faraday rotator, which is an irreversible rotating means, where the polarizing directions are rotated counterclockwise by 22.5 degrees. The rays then collide with a reflecting means consisting of a lens and a concave mirror, and reenter the Faraday rotator after the reflection. At this time, the polarizing directions of the rays are again rotated counterclockwise by 22.5 degrees, due to the irreversibility of the Faraday rotator. It should be noted that the spatial positions of the rays are interchanged by this reflection, but the state of polarization of each ray remains the same as before the reflection.

Next, the rays pass through the second reversible rotating means, and the polarizing directions of the rays are rotated counterclockwise by 45 degrees. As a result, the sum of rotating angles of the polarizing directions of the rays comes to 90 degrees, which means that the state of polarization and spatial positions of the rays have been interchanged. Then, the rays enter the birefringent plate, and the original ordinary ray propagating in the direction of the extraordinary ray recombines with the original extraordinary ray propagating in the direction of the ordinary ray due to the spatial shift effect, and the input optical signal is input into the output optical fiber. Also, in the reverse direction (the direction of isolation), the Faraday rotator and the pair of irreversible rotating means make the sum of rotating angles of the polarizing directions of the rays 0 degrees. Thus, the rays that are input from the output optical fiber are not recombined at the birefringent plate and therefore are not input into the input optical fiber.

Conventionally, there also exists a type of polarization-independent optical isolator, which is disclosed in Patent Literature 2 below. This optical isolator is comprised of, arranged in the stated order, an optical fiber array, a rutile crystal (a birefringent plate), a half-wave plate and a glass plate (a reversible rotating means), a rod lens, a garnet crystal (an irreversible rotating means) and a reflecting mirror. The half-wave plate and the glass plate are arranged so that each covers one half of the area of the rod lens.

In this configuration, an optical signal, which enters from the input optical fiber and propagates in the forward direction, first enters the rutile crystal and is separated into an ordinary ray and an extraordinary ray in a plane including the optical axes of the input optical fiber and the output optical fiber. The separated rays then pass through the glass plate and enter the rod lens, where they are converted to parallel rays. After passing through the rod lens, the separated rays enter the garnet crystal, which is a Faraday rotator, where their polarizing directions are rotated counterclockwise by 22.5 degrees. Next, the rays are reflected by the reflecting mirror, and the spatial positions of the rays are interchanged. The rays reflected by the reflecting mirror reenter the garnet crystal and their polarizing directions are again rotated counterclockwise by 22.5 degrees due to the irreversibility of the garnet crystal. Then, by passing through the half-wave plate after passing through the rod lens, the polarizing directions are further rotated counterclockwise by 45 degrees.

As a result, the sum of rotating angles of the polarizing directions of the rays comes to 90 degrees, which means that the state of polarization and the spatial positions of the rays have been interchanged. Then, the rays enter the rutile crystal, in which the original ordinary ray propagating in the direction of the extraordinary ray recombines with the original extraordinary ray propagating in the direction of the ordinary ray due to the spatial shift effect, and is input into the output optical fiber. Also, in the reverse direction (direction of isolation), the garnet crystal and the half-wave plate are used to make the sum of rotating angles of the polarizing directions of the rays 0 degrees. Thus, the ordinary ray and the extraordinary ray are not recombined in the rutile crystal and therefore are not input into the input optical fiber.

When the optical signal path transmits multiple optical signals, an arrayed optical isolator having multiple input/output ports is used.

Conventionally, this type of arrayed optical isolators include an arrayed optical isolator in which multiple polarization-independent optical isolators are integrated, and a polarization-independent optical isolator array which is disclosed in Patent Literature 3 below. In this polarization-independent optical isolator array, a multifiber optical fiber array (FA) equipped with a lens is provided at the input port and the output port, and two birefringent crystal plates (BP), two Faraday rotators (FR) and multiple polarizing plates (PR) are provided between them to isolate transmission in the reverse direction. In this configuration, an input optical signal, which is input from the input optical fiber and propagates in the forward direction, is output from the output optical fiber but is not input into the input optical fiber in the reverse direction (direction of isolation).

However, the polarization-independent optical isolator disclosed in Patent Literature 1 has four problems, which are described below.

Firstly, because the ordinary ray and the extraordinary ray that are separated by the birefringent plate and the ordinary ray and the extraordinary ray that are reflected by the reflecting means all exist in a plane that includes the optical axes of the input optical fiber and the output optical fiber, the optical path length where the ordinary ray propagates along the central optical axis of the lens is different from the optical path length where the extraordinary ray propagates along the central optical axis of the lens. Thus, the time it takes to propagate to the birefringent plate, where recombination occurs, differs between the ordinary ray and the extraordinary ray, and the dispersion phenomenon of optical signals due to various polarization (polarization mode dispersion) occurs. For example, when a 450 [μm]-thick rutile crystal is used as a birefringent plate, a difference in propagation time of about 0.5 [psec] is estimated between the ordinary ray and the extraordinary ray. This will result in constraints when applying this optical isolator to high-speed optical transmission equipment with transmission rates of 10 [Gb/s] or higher, such as the number of optical isolators that can be used.

Secondly, each optical axis must be accurately aligned at a predetermined angle between the birefringent plate and the reversible rotating means, in order to ensure low insertion loss and high isolation of the optical signal. However, when a pair of reversible rotating means with different directions of optical axis was used, the angles of optical axis had to be adjusted twice. In other words, the polarizing direction of the optical signal, which enters from the input optical fiber and is separated by the birefringent plate, and the direction of the crystal optical axis of the first reversible rotating means must be accurately aligned and, furthermore, the direction of the crystal optical axis of the second reversible rotating means must be accurately aligned at a predetermined angle so that the polarizing direction of the reflected optical signal which is input into the birefringent plate coincides with the composite direction of the birefringent plate.

Thirdly, a large interval of about 250 [μm] was required between the optical axes of the input and the output optical fibers in order to align the optical fibers.

Fourthly, in this configuration, the optical signal, after entering from the input optical fiber, passes through the birefringent plate, the reversible rotating means and the Faraday rotator, before passing through the lens. This causes the incident light from the input optical fiber to diffuse, and the effective diameter of the lens had to be increased. Therefore, it was difficult to reduce the size of the optical isolator.

Also, in the optical isolator disclosed in Patent Literature 2, the angle of optical axis of each optical device is adjusted in advance, and the optical devices are mutually adhered and fixed. Therefore, the second problem associated with the polarization-independent optical isolator disclosed in Patent Literature 1 does not occur. Also, in the optical isolator disclosed in Patent Literature 2, the optical fibers are arrayed and the incident light from the input optical fiber enters the Faraday rotator and the reflecting mirror after passing through the rod lens. Therefore, the third and fourth problems associated with the polarization-independent optical isolator disclosed in Patent Literature 1 do not occur.

However, even in the optical isolator described in Patent Literature 2, a dispersion phenomenon of optical signals caused by ordinary ray and extraordinary ray (polarization mode dispersion) occurs. For example, when a 1300 [μm]-thick rutile crystal is used, a difference of about 1.2 [psec] is estimated between the ordinary ray and the extraordinary ray in the time required to propagate to the rutile crystal where recombination occurs. Due to this difference in propagation time, there will be constraints when applying this optical isolator to high-speed optical transmission equipment with transmission rates of 10 [Gb/s] or higher, such as the number of optical isolators that can be used.

Also, when excited light that has a wavelength of 0.98 [μm] is input in the optical isolator described in Patent Literature 2, iron component, which is the material for the Faraday rotator, absorbs the 0.98 [μm] light and generates heat. As a result, at the fixed adhesion interface between the Faraday rotator and the adjacent rod lens or the reflecting mirror, adhesive degenerate due to rise in temperature and its characteristics change in some cases.

Also, the above conventional optical isolator arrays with integral configuration, comprised of multiple polarization-independent optical isolators, simply increases in size according to the number of integrated optical isolators. Also, in the above conventional optical isolator arrays disclosed in Patent Literature 3, multiple polarizing plates (PR) must be stacked vertically according to the number of optical isolator functions, which causes the functional components, (BP) and (FR), which integrate the functions common to multiple optical isolators, to increase in size. As a result, conventional optical isolator arrays also have tended to be large in size. Also, to increase the number of input/output ports, polarizing plate (PR) must be replaced to meet the increase in the number of ports, which requires time and effort.

Patent Literature 1: Patent No. 2710451 Gazette (Page 3, right column, line 14 to page 4, right column, line 15, FIG. 1)

Patent Literature 2: Japanese Publication of Unexamined Patent Application No. 5-313094 Gazette (paragraphs [0010]-[0014], FIG. 1 and FIG. 2)

Patent Literature 3: Japanese Publication of Unexamined Patent Application No. 5-188324 Gazette (paragraphs [0007]-[0010], FIG. 1 and FIG. 3)

SUMMARY OF THE INVENTION

The present invention has been made to solve the above problems, and an in-line optical isolator having the following distinguishing features has been configured.

The following elements are aligned in the stated order:

an input optical fiber that inputs a forward optical signal and an output optical fiber that outputs the forward optical signal that is input from this input optical fiber, which are arranged in a parallel configuration with optical axes parallel with each other;

a polarization separation device, which separates the forward optical signal into an ordinary ray and an extraordinary ray by applying the spatial shift effect to the extraordinary ray of the optical signal that propagates in a predetermined direction relative to the crystal optical axis;

a polarization plane rotating device, which is provided along either the optical axis of the input optical fiber or the optical axis of the output optical fiber and rotates the respective polarizing directions of the ordinary ray and the extraordinary ray in the reverse direction of rotation, depending on the respective directions of propagation (forward or reverse);

a light collecting means, which changes the light collecting state of the ordinary ray and the extraordinary ray of an optical signal;

a non-reciprocal polarization plane rotating device, which rotates the polarizing directions of the ordinary ray and the extraordinary ray in a constant direction of rotation, independent of the direction of propagation; and a reflecting means, which reflects the ordinary ray and the extraordinary ray of an optical signal that is output from this non-reciprocal polarization plane rotating device, back into the non-reciprocal polarization plane rotating device.

A polarization separation device, a polarization plane rotating device and a non-reciprocal polarization plane rotating device are mutually arranged so that:

when the ordinary ray and the extraordinary ray are separated by the polarization separation device provided along the optical axis of the input optical fiber and propagate in the forward direction, the rotating angles of the polarizing directions of the ordinary ray and the extraordinary ray, which are rotated by the polarization plane rotating device, and the rotating angles of the polarizing directions of the ordinary ray and the extraordinary ray, which are rotated by the non-reciprocal polarization plane rotating device, rotate in the same direction and return to a mutual position, where the ordinary ray and the extraordinary ray coincide due to the spatial shift effect caused by the polarization separation device provided along the optical axis of the output optical fiber; and when the ordinary ray and the extraordinary ray are separated by the polarization separation device provided along the optical axis of the output optical fiber and propagate in the reverse direction, the ordinary ray and the extraordinary ray rotate in opposite directions and cancel out, and mutual position of the ordinary ray and the extraordinary ray are further separated due to the spatial shift effect caused by the polarization separation device provided along the optical axis of the input optical fiber.

The crystal optical axis of the polarization separation device is oriented so that the separation directions of the ordinary ray and the extraordinary ray are arranged in a plane that is perpendicular to a plane including the optical axes of the input optical fiber and the output optical fiber and parallel with the optical axes.

The focusing central optical axis of the light collecting means is arranged at an equal distance from the optical axes of the input optical fiber and the output optical fiber and, on the side of the light collecting means facing the polarization plane rotating device, at a substantially equal distance from the optical axes of the four rays, i.e. the ordinary ray and the extraordinary ray propagating along the optical axis of the input optical fiber and the ordinary ray and the extraordinary ray propagating along the optical axis of the output optical fiber.

According to this configuration, an optical signal that is input from the input optical fiber is separated at the polarization separation device into an ordinary ray and an extraordinary ray in directions that are perpendicular to the plane including the optical axes of the ordinary ray and the extraordinary ray and parallel with these optical axes and, on the side of the light collecting means facing the polarization plane rotating device, optical axes of the ordinary ray and the extraordinary ray are substantially parallel with the focusing central optical axis of the light collecting means and positioned at a substantially equal distance from the focusing central optical axis. Also, the optical axes of the ordinary ray and the extraordinary ray of the reflected optical signal reflected by the reflecting means, on the side of the light collecting means facing the polarization plane rotating device, are also substantially parallel with the focusing central optical axis and positioned at a substantially equal distance from the focusing central optical axis and, at the polarization separation device, the ordinary ray and the extraordinary ray recombine in a direction that is perpendicular to the plane including the optical axes of the input optical fiber and the output optical fiber and parallel with these optical axes. Thus, there is substantially no difference in optical path lengths between the ordinary ray and the extraordinary ray propagating to the polarization separation device, where recombination occurs, and the occurrence of polarization mode dispersion can be substantially eliminated. Therefore, there will be substantially no difference between the ordinary ray and the extraordinary ray in the time required to propagate to the polarization separation device. Thus, there will be no constraint when applying this in-line optical isolator in high-speed optical transmission equipment, such as the number of units that can be used.

Also, according to the present invention, an in-line optical isolator having the following distinguishing features has been configured.

The following elements are aligned in the stated order:

multiple pairs of input optical fibers and output optical fibers, where, an input optical fiber inputs an optical signal in the forward direction and an output optical fiber outputs a forward optical signal that is input from an input optical fiber and these optical fibers are arranged in a parallel configuration with optical axes parallel with each other;

a polarization separation device, which separates a forward optical signal into an ordinary ray and an extraordinary ray by applying the spatial shift effect to the extraordinary ray of optical signal that propagates in a predetermined direction relative to the crystal optical axis;

a polarization plane rotating device, which is provided along either the optical axis of the input optical fiber or the optical axis of the output optical fiber and rotates the respective polarizing directions of the ordinary ray and the extraordinary ray in the reverse direction of rotation, depending on the respective direction of propagation (forward or reverse);

a light collecting means, which changes the light collecting state of the ordinary ray and the extraordinary ray of an optical signal;

a non-reciprocal polarization plane rotating device, which rotates the polarizing directions of the ordinary ray and the extraordinary ray in a constant direction of rotation, independent of the direction of propagation; and a reflecting means, which reflects the ordinary ray and the extraordinary ray of an optical signal that is output from this non-reciprocal polarization plane rotating device, back into the non-reciprocal polarization plane rotating device. A polarization separation device, a polarization plane rotating device and a non-reciprocal polarization plane rotating device are mutually arranged so that:

when the ordinary ray and the extraordinary ray are separated by the polarization separation device provided along the optical axis of the input optical fiber and propagate in the forward direction, the rotating angles of the polarizing directions of-the ordinary ray and the extraordinary ray, which are rotated by the polarization plane rotating device and the rotating angles of the polarizing directions of the ordinary ray and the extraordinary ray, which are rotated by the non-reciprocal polarization plane rotating device, rotate in the same direction and return to mutual positions where the ordinary ray and the extraordinary ray coincide due to the spatial shift effect caused by the polarization separation device provided along the optical axis of the output optical fiber; and when the ordinary ray and the extraordinary ray are separated by the polarization separation device provided along the optical axis of the output optical fiber and propagate in the reverse direction, the ordinary ray and the extraordinary ray rotate in opposite directions and cancel out, and the mutual positions of the ordinary ray and the extraordinary ray are further separated due to the spatial shift effect caused by the polarization separation device provided along the optical axis of the input optical fiber.

The crystal optical axis of the polarization separation device is oriented so that the separation directions of the ordinary ray and the extraordinary ray are arranged in a plane that is perpendicular to a plane including the optical axes of the input optical fiber and the output optical fiber and parallel with the optical axes.

The focusing central optical-axis of the light collecting means is arranged at an equal distance from the optical axes of the paired input optical fiber and the output optical fiber and, on the side of the light collecting means facing the polarization plane rotating device, at a substantially equal distance from each optical axis of the four rays, i.e. the ordinary ray and the extraordinary ray propagating along the optical axis of the input optical fiber and the ordinary ray and the extraordinary ray propagating along the optical axis of the output optical fiber, which is paired with the input optical fiber.

According to this configuration, an optical signal that is input from the input optical fiber is separated at the polarization separation device into an ordinary ray and an extraordinary ray in directions that are perpendicular to the plane including the optical axes of paired ordinary ray and extraordinary ray and parallel with these optical axes and, on the side of the light collecting means facing the polarization plane rotating device, optical axes of these ordinary ray and the extraordinary ray are substantially parallel with the focusing central optical axis of the light collecting means and positioned at a substantially equal distance from the focusing central optical axis. Also, the optical axes of the ordinary ray and the extraordinary ray of the reflected optical signal reflected by the reflecting means, on the side of the light collecting means facing the polarization plane rotating device, are also substantially parallel with the focusing central optical axis and positioned at a substantially equal distance from the focusing central optical axis and, at the polarization separation device, the ordinary ray and the extraordinary ray recombine in a direction that is perpendicular to the plane including the optical axes of paired input optical fiber and output optical fiber and parallel with these optical axes.

For this reason, the number of optical signal paths can be adjusted by only changing the number of pairs of input optical fiber and output optical fiber, without changing the functional components that perform common functions in multiple optical isolators, such as polarization separation device, polarization plane rotating device, light collecting means, non-reciprocal polarization plane rotating device and reflecting means. Therefore, functional components do not increase in size as the number of optical signal paths is increased. Furthermore, there is no need to replace functional components when the number of optical signal paths is increased, and a polarization-independent in-line optical isolator array is provided, which does not require a lot of time and effort to modify. Also, between the paired input optical fiber and output optical fiber, there is substantially no difference in the optical path lengths between the ordinary ray and the extraordinary ray propagating to the polarization separation device where recombination occurs, and there is substantially no occurrence of polarization mode dispersion. Therefore, in this configuration also, there will be substantially no difference between the ordinary ray and the extraordinary ray in the time required to propagate to the polarization separation device. Thus, when applying this polarization-independent in-line optical isolator to high-speed optical transmission equipment, there will be no constraint such as the number of units that can be used.

Also, a distinguishing feature of the present invention is that the input optical fiber and the output optical fiber are integrated as an optical fiber array, and the end face of this optical fiber array is formed perpendicular to the plane including the optical axes of the input optical fiber and the output optical fiber and perpendicular to each optical axis and, the optical input/output end faces of the polarization separation device and the polarization plane rotating device and the end face of the light collecting means facing the polarization plane rotating device are arranged substantially parallel with the end face of the optical fiber array.

According to this configuration, an optical signal that is input from the input optical fiber perpendicularly enters the end face of the polarization separation device, and the ordinary ray and the extraordinary ray separated by the polarization separation device propagate in a direction that is perpendicular to the optical input/output end faces of the polarization separation device and the polarization plane rotating device and the end face of the light collecting means facing the polarization plane rotating device. Also, a reflected optical signal reflected by the reflecting means also propagates in a direction that is perpendicular to the end face of the light collecting means facing the polarization plane rotating device and the optical input/output end faces of the polarization separation device and polarization plane rotating device.

Also, a distinguishing feature of the present invention is that the input optical fiber and the output optical fiber are integrated as an optical fiber array, and the end face of this optical fiber array is inclined at a predetermined angle to a plane that is perpendicular to the optical axes of both the input optical fiber and the output optical fiber and, the face of the light collecting means facing the optical fiber array is inclined at a predetermined angle to a plane that is perpendicular to the focusing central optical axis of the light collecting means so that it is substantially parallel with the end face of the optical fiber array and, the optical input/output end faces of the polarization separation device and the polarization plane rotating device are aligned at the same inclination as the end face of this optical fiber array.

According to this configuration, reflected light, which is generated when optical signal that is input from the input optical fiber and reflected optical signal resulting from the input optical signal being reflected by the reflecting means are reflected by the optical input/output end faces of the, polarization separation device and polarization plane rotating device and the end face of the light collecting means facing the polarization plane rotating device, will not return to its original propagation direction, and will not be input into the original input optical fiber. Thus, the effects of reflected light, which is generated when optical signal that is input from the input optical fiber and reflected optical signal resulting from the input optical signal being reflected by the reflecting means are reflected by the end faces, will be reduced. Therefore, unintended reflected light is less likely to be input into the optical equipment connected to the input optical fiber and the output optical fiber, and the reflected light will not become a noise in the optical equipment when the optical signal propagates in the forward direction.

Also, a distinguishing feature of the present invention is that the optical fiber array is comprised of a multifiber ferrule.

According to this configuration, an optical fiber array is connected to optical fibers that comprise optical signal paths, through a multifiber ferrule. Thus, the in-line optical isolator can be easily connected to optical fibers.

Also, a distinguishing feature of the present invention is that the multifiber ferrule has open capillaries, in which input optical fiber and output optical fiber are inserted, or V-shaped grooves that are fabricated in parallel, in which input and output optical fibers are placed and fixed.

According to this configuration, an in-line optical isolator is connected to multiple optical fibers that comprise optical signal paths, through optical fibers aligned in capillaries or V-shaped grooves of a multifiber ferrule. Thus, an in-line optical isolator can be easily connected to multiple optical fibers. Also, an in-line optical isolator with different number of input/output ports can be configured by only replacing the optical fiber array with one that has a different number of optical fibers.

Also, a distinguishing feature of the present invention is that, between the polarization separation device and the light collecting means, a polarization plane rotating device is provided at a position where either an optical signal propagating along the optical axis of input optical fiber or an optical signal propagating along the optical axis of output optical fiber passes through, and an amorphous optical device is provided at a position where the other optical signal passes through.

According to this configuration, the polarizing directions of an optical signal that is input from the input optical fiber is rotated by a predetermined angle by the polarization plane rotating device, either immediately after the ordinary ray and the extraordinary ray are separated by the polarization separation device, or after the rays are separated by the polarization separation device and reflected by the reflecting means. Therefore, the effect on optical signals will not change even if the positions of the polarization plane rotating device and the amorphous optical device are interchanged, and it is therefore possible to interchange their positions.

Also, a distinguishing feature of the present invention is that a heat insulating means is provided between the light collecting means and the non-reciprocal polarization plane rotating device.

According to this configuration, even if iron component of the non-reciprocal polarization plane rotating device absorbs the optical signal of a predetermined wavelength and generates heat, this heat will not conduct to the light collecting means adjacent to the non-reciprocal polarization plane rotating device, because of the heat insulating means. Thus, between the non-reciprocal polarization plane rotating device and the adjacent light collecting means, conventional problems of degeneration of adhesive and change in its characteristics, caused by rise in temperature from heat generation, will not occur.

Also, a distinguishing feature of the present invention is that a reflecting means is directly fabricated and formed on the side of the non-reciprocal polarization plane rotating device opposite the side facing the light collecting means.

According to this configuration, the side of the non-reciprocal polarization plane rotating device opposite the side facing the light collecting means functions as a reflecting means as is. Thus, there is no need to newly provide a separate reflecting means adjacent to the non-reciprocal polarization plane rotating device, and an in-line optical isolator can be configured compactly.

Also, a distinguishing feature of the present invention is that the non-reciprocal polarization plane rotating device is magnetized in advance.

According to this configuration, the polarizing direction of the optical signal passing through the non-reciprocal polarization plane rotating device can be rotated by the magnetic field of the non-reciprocal polarization plane rotating device. Thus, there is no need to provide a device that applies a magnetic field to the non-reciprocal polarization plane rotating device from the outside, and an in-line optical isolator can be configured compactly.

In the in-line optical isolator according to the present invention, there is substantially no difference in the optical path lengths between the ordinary ray and the extraordinary ray propagating to the polarization separation device where recombination occurs, and occurrence of polarization mode dispersion can be substantially eliminated. Therefore, there will be substantially no difference between the ordinary ray and the extraordinary ray in the time required to propagate to the polarization separation device. Thus, there will be no constraint when applying this in-line optical isolator in high-speed optical transmission equipment, such as the number of units that can be used. Also, the number of optical signal paths can be adjusted by only changing the number of pairs of optical fibers, without changing the functional components that perform common functions in multiple optical isolators. Thus, a compact, polarization-independent multifiber in-line optical isolator can be provided, which does not require a lot of time and effort to increase the optical signal paths.

BRIEF DESCRIPTION OF THE DRAWINGS

FIG. 11 shows the configuration of an in-line optical isolator according to the third embodiment of the present invention when an optical signal propagates in the reverse direction, and (a) is the plan view and (b) is the side view.

DESCRIPTION OF PREFERRED EMBODIMENT

Figure 1:
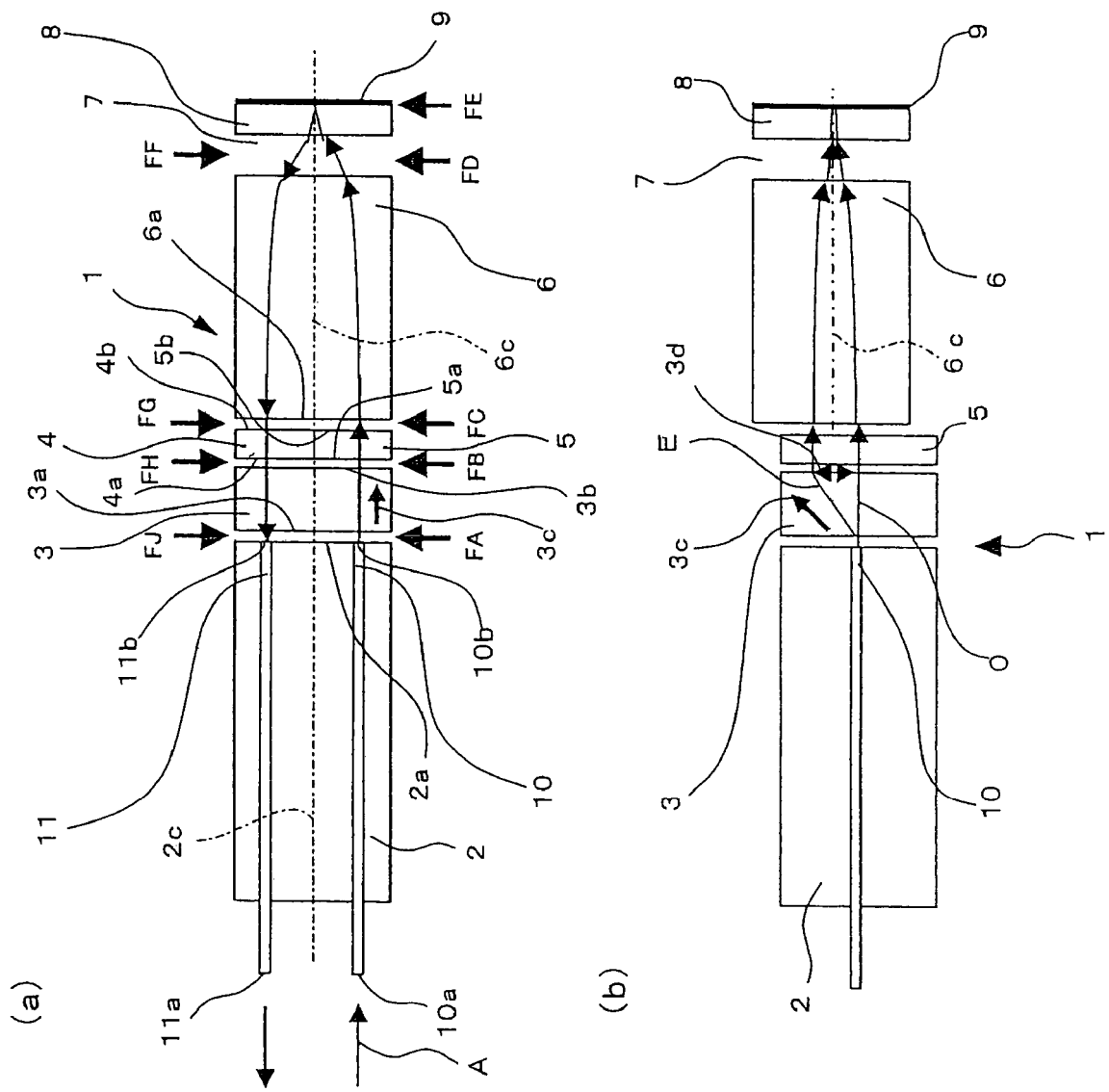
FIG. 1 shows the configuration of an in-line optical isolator according to the first embodiment of the present invention when an optical signal propagates in the forward direction, and (a) is the plan view and (b) is the side view.

Next, the first embodiment of the present invention is described, where an in-line optical isolator according to the present invention is applied to a fiber-optic communication system.

FIG. 1(a) is the plan view of an in-line optical isolator (1) according to this embodiment and FIG. 1(b) is the side view. The in-line optical isolator (1) is configured with the following elements arranged in the stated order: an optical fiber array (2), a rutile crystal (3), a quartz glass plate (4) and a half-wave plate (5), a focusing rod lens (6), an air gap (7), a magnetized garnet crystal (8) and a total reflecting mirror (9).

In the optical fiber array (2), optical fibers (10, 11) whose optical axes are parallel with each other, are arranged in parallel and integrated at an interval of 125 [μm]. Optical fibers (10, 11) comprise an input optical fiber that inputs a forward optical signal and an output optical fiber that outputs the forward optical signals that is input from the input optical fiber (10), respectively, and the in-line optical isolator (1) is configured so that a forward optical signal that is input from one optical fiber (10) is output from the other optical fiber (11). Ends (10a, 11a) of the optical fibers (10, 11) are fixed with a multifiber ferrule or a single fiber ferrule not shown in the figure, and is connected through this ferrule to an optical signal path comprised of optical fibers. Also, the other ends (10b, 11b) of the optical fibers (10, 11) are arranged on the end face (2a) of the optical fiber array (2). This end face (2a) is perpendicular to the plane including the optical axes of the optical fiber (10, 11) and is polished and formed perpendicular to each optical axis, and the optical input/output end faces (3a, 3b, 4a, 4b, 5a, 5b) of the rutile crystal (3), the quartz glass plate (4) and the half-wave plate (5) and the end face (6a) of the focusing rod lens (6) facing the quartz glass plate (4) and the half-wave plate (5) are each arranged substantially parallel with the end face (2a) of the optical fiber array (2).

The rutile crystal (3) is a 300 [μm]-thick birefringent crystal and comprises a polarization separation device, which separates an optical signal (A) input from the forward direction into ordinary ray (O) and extraordinary ray (E). This rutile crystal (3) applies a spatial shift effect (3d) to the ordinary ray (O) or the extraordinary ray (E) of an optical signal which is polarized in a direction that is parallel with its crystal optical axis (3c). The crystal optical axis (3c) of rutile crystal (3) is oriented so that the separation directions of the ordinary ray (O) and the extraordinary ray (E) are perpendicular to a plane including the optical axes of the optical fibers (10, 11) and arranged in a plane that is parallel with the optical axes of the optical fibers (10, 11).

Between the rutile crystal (3) and the focusing rod lens (6), a half-wave plate (5), which is a polarization plane rotating device that rotates the polarizing directions of the ordinary ray (O) and the extraordinary ray (E) in the reverse direction of rotation depending on the propagating direction (forward or reverse), is provided at a position where an optical signal that is input from the input optical fiber (10) passes through. Also, a quartz glass plate (4), which is an amorphous optical device, is provided at a position where a reflected optical signal reflected by the total reflecting mirror (9) passes through. The quartz glass plate (4), in forward operation, is arranged parallel with the half-wave plate (5) so that only the optical signal (A) input from the input optical fiber (10) passes through the half-wave plate (5) and only the reflected optical signal (A) reflected by the total reflecting mirror (9) passes through the quartz glass plate (4). The optical axis of the half-wave plate (5) is oriented at an angle of 22.5 degrees counterclockwise from the polarizing directions of the ordinary ray (O), which is propagating in the forward direction after being separated. When the optical signal (A) propagates in the forward direction as indicated by an arrow in FIG. 1(a), the half-wave plate (5) rotates the polarizing directions of the ordinary ray (O) and the extraordinary ray (E) counterclockwise by 45 degrees each and, when the optical signal (A) propagates in the reverse direction as indicated by an arrow in FIG. 3(a), the half-wave plate (5) rotates the polarizing directions of the ordinary ray (O) and the extraordinary ray (E) clockwise by 45 degrees each.

The focusing rod lens (6), which is comprised of a diffraction distribution type rod lens with a phase difference of about $\pi/2$, comprises the light collecting means that changes the light collecting state of the ordinary ray (O) and the extraordinary ray (E). When the ordinary ray (O) and the extraordinary ray (E) are propagating in the forward direction, this focusing rod lens (6) converts these rays to parallel rays and moves them closer to each other before collecting. When the ordinary ray (O) and the extraordinary ray (E) are propagating in the reverse direction, this focusing rod lens (6) converts these rays to parallel rays and moves them away from each other on the end face (6a) side. Also, the focusing central optical axis (6c) of the focusing rod lens (6) is parallel with the optical axes of the optical fibers (10, 11) and is arranged on a plane that is perpendicular to the plane including the optical axes of the optical fibers (10, 11) and includes the center line (2c) between the optical axes of the optical fibers (10, 11), and is arranged at an equal distance from the optical axes of the optical fibers (10, 11). Also, this focusing central optical axis (6c) is arranged on the end face (6a) side at a substantially equal distance from the four rays, i.e. the ordinary ray (O) and the extraordinary ray (E) propagating along the optical axis of the optical fiber (10) and the ordinary ray (O) and the extraordinary ray (E) propagating along the optical axis of the optical fiber (11).

The magnetized garnet crystal (8) is magnetized in advance in this embodiment, and comprises a reciprocal polarization plane rotating device that constantly rotates the polarizing directions of the ordinary ray (O) and the extraordinary ray (E) counterclockwise by only 22.5 degrees, independent of the direction of propagation. Also, an air gap (7) of about 200 [μm] is provided as a heat insulating means between the focusing rod lens (6) and the magnetized garnet crystal (8). The total reflecting mirror (9) is directly formed by vapor deposition on the side of the magnetized garnet crystal (8) opposite the side facing the focusing rod lens (6). The total reflecting mirror (9) comprises a reflecting means, which reflects the ordinary ray (O) and the extraordinary ray (E) of the optical signal output from the magnetized garnet crystal (8) as a reflected optical signal and inputs this reflected optical signal back into the magnetized garnet crystal (8).

Figure 2:
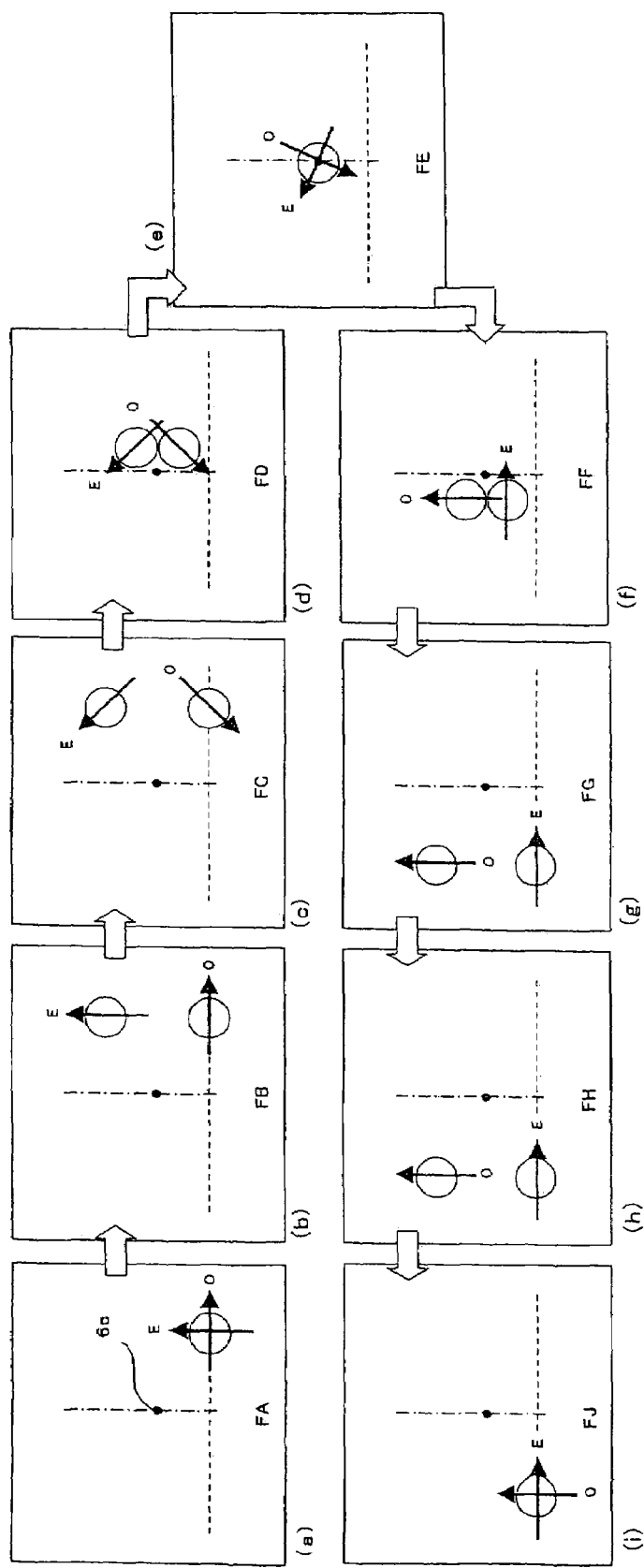
FIG. 2 is a state relation diagram that shows the state of polarization and the positional relation of the ordinary ray and the extraordinary ray propagating in the forward direction, at each position of an in-line optical isolator according to the first embodiment of the present invention.

Next, operation in the above configuration is described, when an optical signal (A) that has a wavelength of 1.55 [μm] propagates through the in-line optical isolator (1) in the forward direction. Said FIG. 1 shows the optical signal path of the optical signal (A) input from the optical fiber (10) in the forward direction. FIG. 2(a)-(i) shows the state of polarization and the positional relation of the ordinary ray (O) and the extraordinary ray (E) of the optical signal (A) at each of the positions FA, FB, FC, FD, FE, FF, FG, FH and FJ shown in FIG. 1. FIG. 2 is illustrated to show a view of the rutile crystal (3) side as viewed from the optical fiber array (2) side in FIG. 1, and the direction that is perpendicular to the page is the direction of the optical axes of the optical fibers (10, 11). In FIG. 2 also, the horizontal dotted line indicates the plane including the optical axes of the optical fibers (10, 11), and the vertical dashed line indicates a plane that passes through the center line (2c) between the optical axes of the optical fibers (10, 11) and is perpendicular to the plane including the optical axes of the optical fibers (10, 11). This plane includes the focusing central optical axis (6c) of the focusing rod lens (6).

An optical signal (A) input in the forward direction from the other end (10b) of the input optical fiber (10) is first input perpendicularly into the end face (3a) of the rutile crystal (3). FIG. 2(a) shows the state of polarization and the positional relation of the optical signal (A) at this time, and the ordinary ray (O) and the extraordinary ray (E) are intersecting perpendicularly. Because the crystal optical axis (3c) of the rutile crystal (3) is oriented in a direction that is perpendicular to the plane including the optical axes of the optical fibers (10, 11) as described above, when the optical signal (A) passes through the rutile crystal (3), the extraordinary ray (E) having a polarizing direction parallel with the crystal optical axis (3c) is affected by the spatial shift effect (3d) from the ordinary ray (O) having a polarizing direction that is perpendicular to the crystal optical axis (3c), and the ordinary ray (O) and the extraordinary ray (E) are separated in directions that are perpendicular to the plane including the optical axes of the optical fibers (10, 11), as shown in FIG. 2(b).

The separated ordinary ray (O) and extraordinary ray (E) are input perpendicularly into the end face (5a) of the half-wave plate (5). At this time, because the optical axis of the half-wave plate (5) is oriented at an angle of 22.5 degrees counterclockwise from the polarizing directions of the ordinary ray (O) in the state shown in FIG. 2(b), the polarizing directions of the ordinary ray (O) and the extraordinary ray (E) are each rotated counterclockwise by 45 degrees as shown in FIG. 2(c).

The ordinary ray (O) and the extraordinary ray (E) that passed through the half-wave plate (5) are then input perpendicularly into the end face (6a) of the focusing rod lens (6). At this time, the ordinary ray (O) and the extraordinary ray (E) are input in such positions that the rays are at a substantially equal distance above and below a plane that is parallel with the plane including the optical axes of the optical fibers (10, 11) and includes the focusing central optical axis (6c) of the focusing rod lens (6). At this time, the ordinary ray (O) and the extraordinary ray (E) are at a substantially equal distance from the focusing central optical axis (6c) of the focusing rod lens (6). In the focusing rod lens (6), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 2(d).

The ordinary ray (O) and the extraordinary ray (E), which are output from the end face of the lens of the focusing rod lens (6) then pass through the air gap (7) of about 200 [μm] and are input into the magnetized garnet crystal (8). The polarizing directions of the ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), and the positions of the ordinary ray (O) and the extraordinary ray (E) substantially coincide on this total reflecting mirror (9), as shown in FIG. 2(e).

Next, the ordinary ray (O) and the extraordinary ray (E), which are reflected by the total reflecting mirror (9) become a reflected optical signal (A), which is again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be each rotated counterclockwise by 45 degrees and, together with the 45 degrees rotation at the half-wave plate (5), they will be rotated counterclockwise by 90 degrees as a result. This state is shown in FIG. 2(f).

Also, in a plane that is perpendicular to the plane including the optical axes of the optical fibers (10, 11), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10, 11), the spatial positions of the ordinary ray (O) and the extraordinary ray (E) are interchanged across the focusing central optical axis (6c) of the focusing rod lens (6), from the optical fiber (10) side to the optical fiber (11) side.

Next, the ordinary ray (O) and the extraordinary ray (E), which are output from the magnetized garnet crystal (8) pass through the air gap (7) of about 200 [μm] and are input into the focusing rod lens (6). Due to the effects of the focusing rod lens (6), the ordinary ray (O) and the extraordinary ray (E) are converted to parallel rays and, as they propagate, move away from the focusing central optical axis (6c) as well as from each other. This state is shown in FIG. 2(g); Next, the ordinary ray (O) and the extraordinary ray (E) pass through the quartz glass plate (4) but the polarizing directions of the rays are not affected. This state is shown in FIG. 2(h).

Next, the ordinary ray (O) and the extraordinary ray (E) are input perpendicularly into the end face (3b) of the rutile crystal (3). In the rutile crystal (3), the ordinary ray (O) is affected by the spatial shift effect, because its polarizing direction has been rotated by 90 degrees and is parallel with the crystal optical axis (3c) of the rutile crystal (3). However, the extraordinary ray (E) passes through the rutile crystal (3) without being affected by the spatial shift effect, because its polarizing direction has been rotated by 90 degrees and is perpendicular to the crystal optical axis (3c) of the rutile crystal (3). Therefore, the ordinary ray (O) affected by the spatial shift effect recombines with the extraordinary ray (E), as shown in FIG. 2(i). The recombined ordinary ray (O) and extraordinary ray (E) are input into the optical fiber (11) and transmitted to an external optical signal path as a forward output optical signal.

Figure 3:
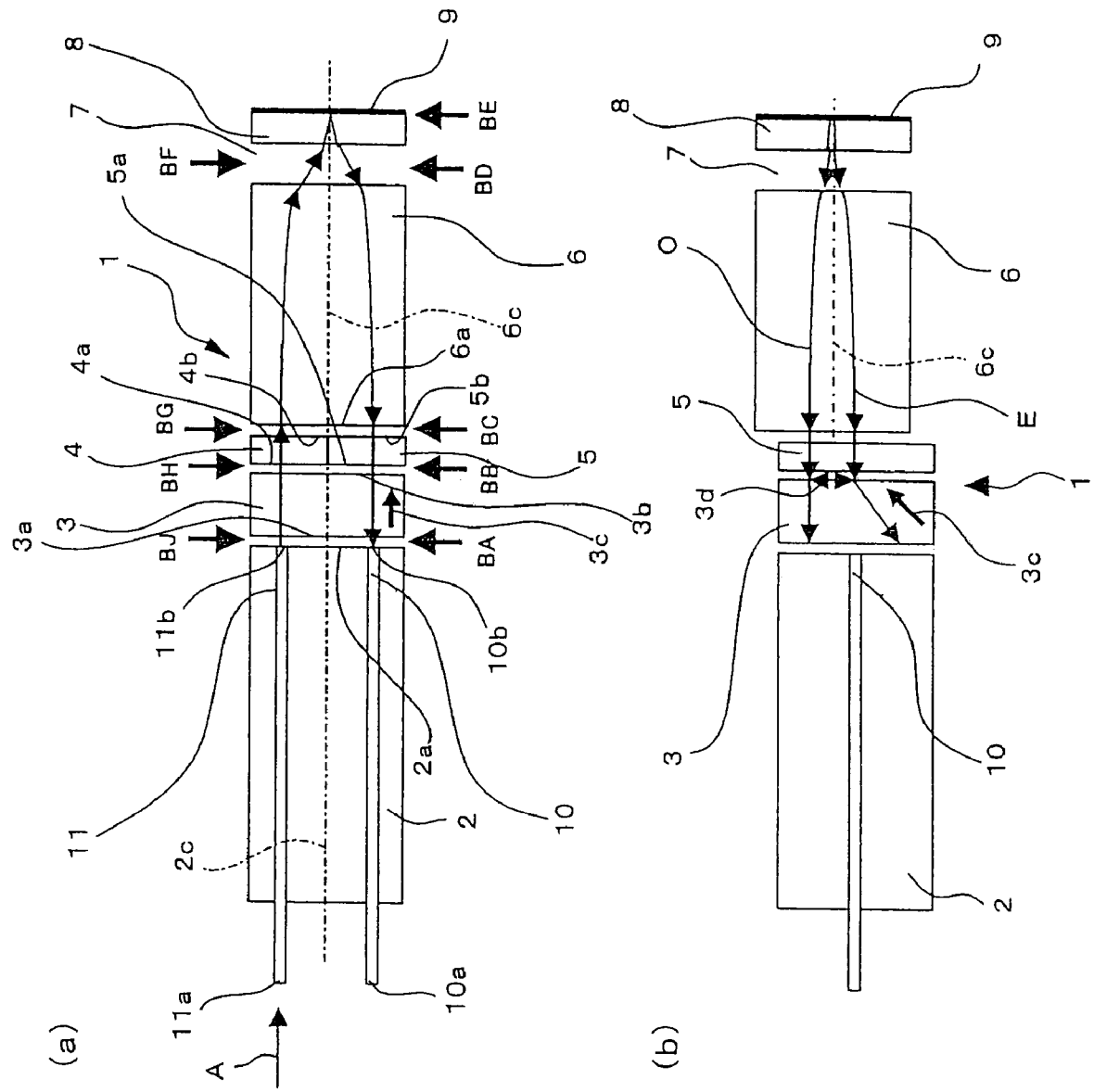
FIG. 3 shows the configuration of an in-line optical isolator according to the first embodiment of the present invention when an optical signal propagates in the reverse direction, and (a) is the plan view and (b) is the side view.
Figure 4:
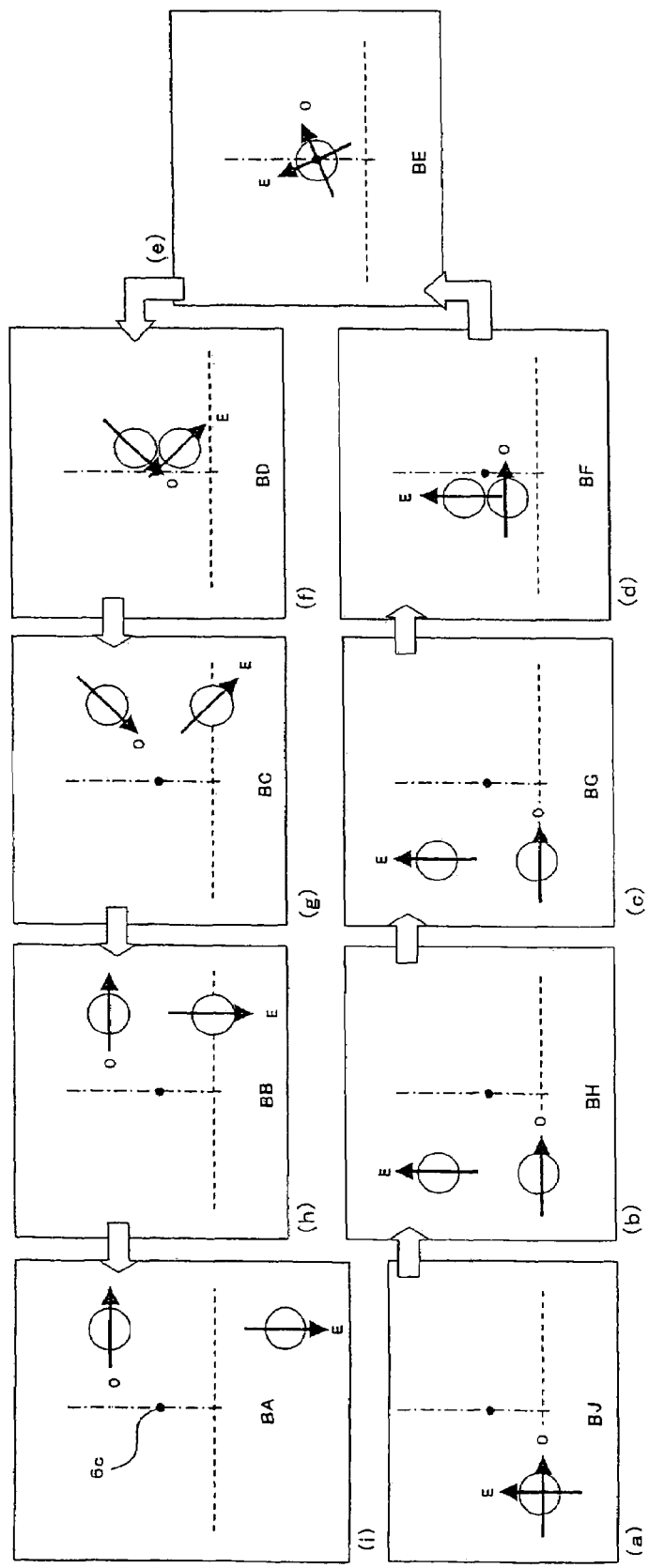
FIG. 4 is a state relation diagram that shows the state of polarization and the positional relation of the ordinary ray and the extraordinary ray propagating in the reverse direction, at each position of an in-line optical isolator according to the first embodiment of the present invention.

Next, operation in the above configuration is described, when an optical signal (A) that has a wavelength of 1.55 [μm] propagates through an in-line optical isolator (1) in the reverse direction. FIG. 3 shows the optical signal path of the optical signal (A) input from the optical fiber (11) in the reverse direction. FIG. 3(a) is the plan view of the in-line optical isolator (1) and FIG. 3(b) is the side view. In this figure, the parts that are identical to FIG. 1 are given identical codes and their descriptions are omitted. FIG. 4(a)-(i) shows the state of polarization and the positional relation of the ordinary ray (O) and the extraordinary ray (E) of the optical signal (A) at each of the positions BA, BB, BC, BD, BE, BF, BG, BH and BJ shown in FIG. 3. As with said FIG. 2, FIG. 4 is illustrated to show a view of the rutile crystal (3) side as viewed from the optical fiber array (2) side, and the direction that is perpendicular to the page is the direction of the optical axes of the optical fibers (10, 11). In FIG. 4 also, the horizontal dotted line indicates a plane including the optical axes of the optical fibers (10, 11), and the vertical dashed line indicates a plane that passes through the center line (2c) between the optical axes of the optical fibers (10, 11) and is perpendicular to the plane including the optical axes of the optical fibers (10, 11), and this plane includes the focusing central optical axis (6c) of the focusing rod lens (6).

As shown in FIG. 3, an optical signal (A) that has a wavelength of 1.55 [μm], which is input from the optical fiber (11) in the reverse direction, is first input perpendicularly to the end face (3a) of the rutile crystal (3). FIG. 4(a) shows the state of the optical signal (A) at this time, and the ordinary ray (O) and the extraordinary ray (E) are intersecting perpendicularly. In the optical signal (A) input into the rutile crystal (3), as described above, the extraordinary ray (E) having a polarizing direction parallel with the crystal optical axis (3c) is affected by the spatial shift effect (3d) from the ordinary ray (O) having a polarizing direction that is perpendicular to the crystal optical axis (3c), as shown in FIG. 4(b), and the ordinary ray (O) and the extraordinary ray (E) are separated in directions that are perpendicular to the plane including the optical axes of the optical fibers (10, 11). Next, the separated ordinary ray (O) and extraordinary ray (E) pass through the quartz glass plate (4), but the polarizing directions of the ordinary ray (O) and the extraordinary ray (E) are not affected and do not rotate. This state is shown in FIG. 4(c).

Next, the ordinary ray (O) and the extraordinary ray (E), which are output from the quartz glass plate (4), are input perpendicularly into the end face (6a) of the focusing rod lens (6). At this time, the ordinary ray (O) and the extraordinary ray (E) are input in such positions that the rays are at a substantially equal distance above and below a plane that is parallel with the plane including the optical axes of the optical fibers (10, 11) and includes the focusing central optical axis (6c) of the focusing rod lens (6). At this time, the ordinary ray (O) and the extraordinary ray (E) are at a substantially equal distance from the focusing central optical axis (6c) of the focusing rod lens (6). In the focusing rod lens (6), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 4(d).

The ordinary ray (O) and the extraordinary ray (E), which are output from the end face of the lens of the focusing rod lens (6), then pass through the air gap (7) of about 200 [μm] and are input into the magnetized garnet crystal (8). The polarizing directions of the incident ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), but the positions of the ordinary ray (O) and the extraordinary ray substantially coincide on this total reflecting mirror (9), as shown in FIG. 4(e). Next, the ordinary ray (O) and the extraordinary ray (E) reflected by the total reflecting mirror (9) become a reflected optical signal (A), which is again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be rotated counterclockwise by 45 degrees as a result. This state is shown in FIG. 4(f).

Also, in a plane that passes through the focusing central optical axis (6c) of the focusing rod lens (6) and is perpendicular to the plane including the optical axes of the optical fibers (10, 11), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10, 11), the spatial positions of the ordinary ray (O) and the extraordinary ray (E) are interchanged across the focusing central optical axis (6c) of the focusing rod lens (6), from the optical fiber (11) side to the optical fiber (10) side.

Next, the ordinary ray (O) and the extraordinary ray (E), which are output from the magnetized garnet crystal (8), pass through the air gap (7) of about 200 [μm] and are input into the focusing rod lens (6). Due to the effects of the focusing rod lens (6), the ordinary ray (O) and the extraordinary ray (E) are converted to parallel rays and, as they propagate, move away from the focusing central optical axis (6c) as well as from each other. This state is shown in FIG. 4(g).

Next, the separated ordinary ray (O) and extraordinary ray (E) are input perpendicularly into the end face (5b) of the half-wave plate (5), but because the optical axis of the half-wave plate (5) is oriented at an angle of −22.5 degrees with the polarizing direction of the ordinary ray (O) in the state shown in FIG. 4(g), the polarizing directions of the ordinary ray (O) and the extraordinary ray (E) are rotated counterclockwise by −45 degrees. As a result, the −45 degrees rotating angle of polarizing directions rotated by the half-wave plate (5) and the 45 degrees rotating angle of polarizing directions rotated by the magnetized garnet crystal (8) cancel out to make the sum of rotating angles of the polarizing directions of the rays 0 degrees. This state is shown in FIG. 4(h).

The ordinary ray (O) and the extraordinary ray (E), which have passed through the half-wave plate (5) are input perpendicularly into the end face (3a) of the rutile crystal (3). At this time, the ordinary ray (O) passes through the rutile crystal (3) without being affected by the spatial shift effect, because its polarizing direction is perpendicular to the crystal optical axis (3c) of the rutile crystal (3). Also, the extraordinary ray (E) is affected by the spatial shift effect and moves away from the ordinary ray (O), as shown in FIG. 4(i), because its polarizing direction is parallel with the crystal optical axis (3c) of the rutile crystal (3). As a result, the ordinary ray (O) and the extraordinary ray (E) are not recombined, and neither ray is input into the optical fiber (10) because each ray deviates from the optical fiber (10) by about 30 [μm]. Thus, isolation in the reverse direction is achieved for the optical signal (A).

According to such an in-line optical isolator (1) according to the first embodiment of the present invention, as described, the optical signal (A) input in the forward direction from the optical fiber (10) is separated at the rutile crystal (3) into the ordinary ray (O) and the extraordinary ray (E) in directions that are perpendicular to the plane including the optical axes of the optical fibers (10, 11) and, at the focusing rod lens (6), the optical axes of the ordinary ray (O) and the extraordinary ray (E) are substantially parallel with and positioned at a substantially equal distance from its focusing central optical axis (6c). Also, at the focusing rod lens (6), the optical axes of the ordinary ray (O) and the extraordinary ray (E) of the reflected optical signal (A) reflected by the total reflecting mirror (9) are also substantially parallel with and positioned at a substantially equal distance from the focusing central optical axis (6c) and, at the rutile crystal (3), the ordinary ray (O) and the extraordinary ray (E) of the reflected optical signal (A) recombine in a direction that is perpendicular to the plane including the optical axes of the optical fibers (10, 11). Therefore, there is substantially no difference in the optical path lengths between the ordinary ray (O) and the extraordinary ray (E) that are input from the optical fiber (10) and propagating. Consequently, polarization mode dispersion in the forward direction can be substantially eliminated, i.e. it is only 0.01 [psec] even when a 300 [μm]-thick rutile crystal (3) is used as in this embodiment. Thus; there is substantially no difference between the ordinary ray (O) and the extraordinary ray (E) in the time required to propagate to the rutile crystal (3). Therefore, when applying this in-line optical isolator (1) to high-speed optical transmission equipment with transmission rates of 10 [Gb/s] or higher, there will be no constraint such as the number of units that can be used, and there will be no problem in practical use.

Also, in the above embodiment, the effects of the half-wave plate (5) and the quartz glass plate (4) on optical signals do not change when their positions are interchanged, and it is therefore possible to interchange their positions. In other words, it suffices that the half-wave plate (5) is arranged at a position where either the optical signal (A) or the reflected optical signal (A) passes through and the quartz glass plate (4) is arranged at a position where the other signal passes through, between the rutile crystal (3) and the focusing rod lens (6). In either arrangement, the optical signal (A) input from the input optical fiber (10) either has its polarizing direction rotated by 45 degrees by the half-wave plate (5) immediately after their ordinary ray (O) and extraordinary ray (E) are separated at the rutile crystal (3) or, have its polarizing direction rotated by 45 degrees by the half-wave plate (5) after the rays are separated at the rutile crystal (3) and reflected by the total reflecting mirror (9).

Also, in the above embodiment, even if iron component of the magnetized garnet crystal (8) absorbs light that has a wavelength of 0.98 [μm] and generates heat, this heat is prevented from conducting to the focusing rod lens (6) adjacent to the magnetized garnet crystal (8), because an air gap (7) of about 200 [μm] is provided between the focusing rod lens (6) and the magnetized garnet crystal (8). Thus, there is no adhesive in the optical signal path of the optical signal (A) and, between the magnetized garnet crystal (8) and the adjacent focusing rod lens (6), adhesive will not degenerate and its characteristics will not change due to rise in temperature from heat generation, as in the past. Light that has a wavelength of 0.98 [μm] and an output power of 100 [mW] was actually irradiated for 24 hours, and it was confirmed that the characteristics did not change before and after the irradiation.

Also, in the above embodiment, the side of the magnetized garnet crystal (8) opposite the side facing the focusing rod lens (6) functions as a total reflecting mirror (9) as is, because the total reflecting mirror (9) is directly formed by vapor deposition on the side of the magnetized garnet crystal (8) opposite the side facing the focusing rod lens (6). Thus, there is no need to newly provide a separate reflecting means adjacent to the magnetized garnet crystal (8), and an in-line optical isolator (1) can be configured compactly.

Also, in the above embodiment, because the magnetized garnet crystal (8) is magnetized in advance, polarizing direction of an optical signal passing through the magnetized garnet crystal (8) can be rotated by its magnetic field. Thus, there is no need to provide a device that applies a magnetic field to the magnetized garnet crystal (8) from the outside, and an in-line optical isolator (1) can be configured compactly.

Also, in the above embodiment, the optical fiber array (2) is connected to optical fibers that comprise optical signal paths through a multifiber ferrule, because the optical fiber array (2) is comprised of a multifiber ferrule. Thus, the in-line optical isolator (1) can be easily connected to optical fibers.

Next, the second embodiment is described, where an in-line optical isolator according to the present invention is applied to a fiber-optic communication system.

FIG. 5(a) is the plan view of an in-line optical isolator (20) according to this embodiment of the present invention and FIG. 5(b) is the side view. In the following description of the in-line optical isolator (20) according to this embodiment, the constituent elements that are identical or equivalent to the constituent elements of the in-line optical isolator (1) according to the first embodiment are given the same codes and their descriptions are omitted.

The in-line optical isolator (20) is configured with the following elements aligned in the stated order: an optical fiber array (22), a rutile crystal (3), a quartz glass plate (4)

and a half-wave plate (5), a focusing rod lens (26), an air gap (7), a magnetized garnet crystal (8) and a total reflecting mirror (9). In this embodiment, the end face (22a) of optical fiber array (22) is rotated around an axis that is in the plane including the optical axes of the optical fibers (10, 11) and is perpendicular to each optical axis and, is arranged at an angle of 8 degrees with respect to a plane that is perpendicular to the plane including the optical axes of the optical fibers (10, 11) and is perpendicular to each optical axis. Optical input/output end faces (3a, 3b, 4a, 4b, 5a, 5b) of the rutile crystal (3), the quartz glass plate (4) and the half-wave plate (5) are arranged parallel with the end face (22a) of optical fiber array (22), i.e. inclined at an angle of 8 degrees. Furthermore, the end face (26a) of the focusing rod lens (26) facing the quartz glass plate (4) and the half-wave plate (5) is formed at an angle of 8 degrees so that it is substantially parallel with the end face (22a) of optical fiber array (22). Also, the optical axis of the half-wave plate (5) is aligned for an input optical signal (A) entering obliquely at an angle of 8 degrees. Configurations not described above are the same as in the in-line optical isolator (1) in the first embodiment.

Figure 5:
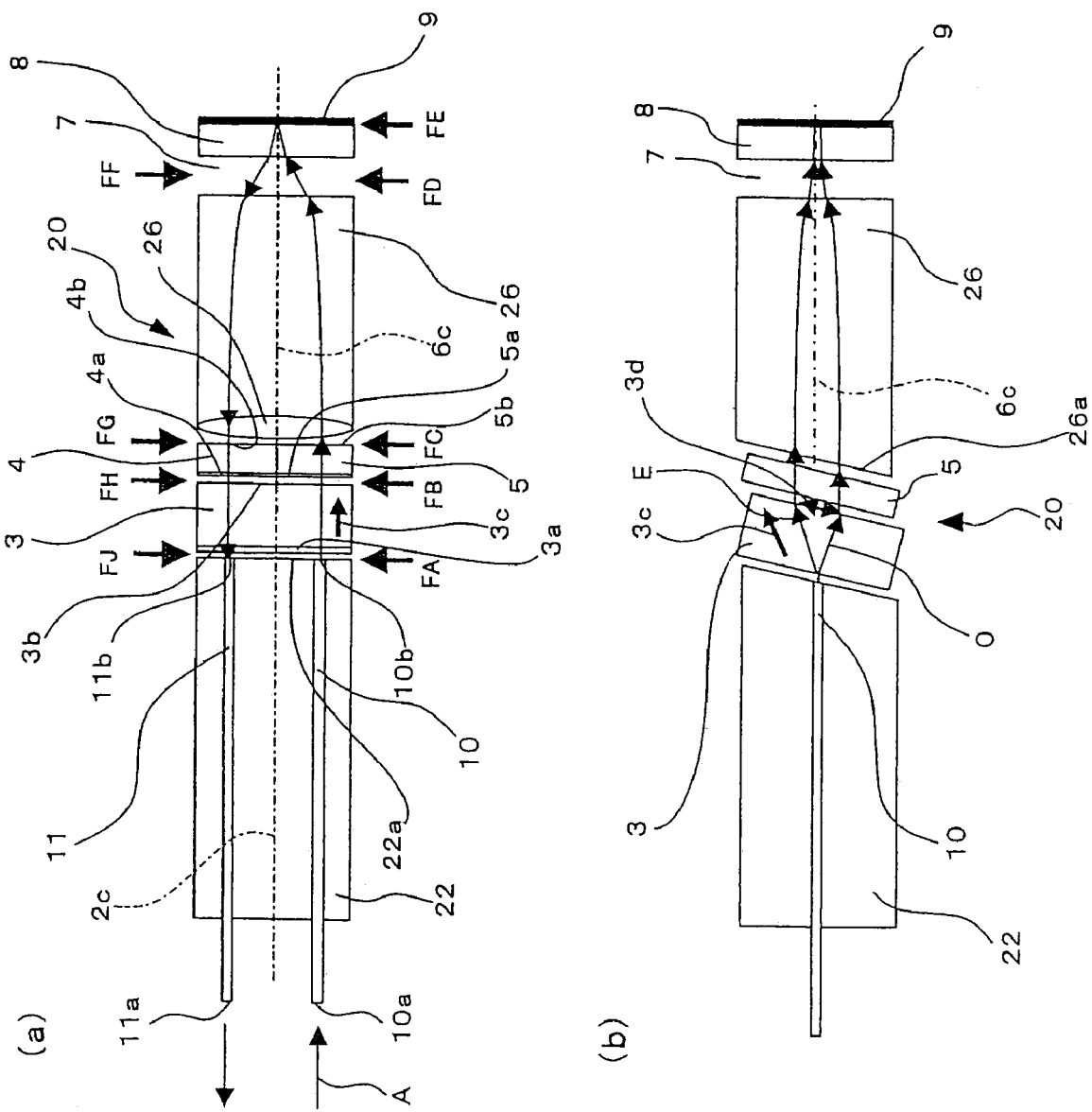
FIG. 5 shows the configuration of an in-line optical isolator according to the second embodiment of the present invention when an optical signal propagates in the forward direction, and (a) is the plan view and (b) is the side view.
Figure 6:
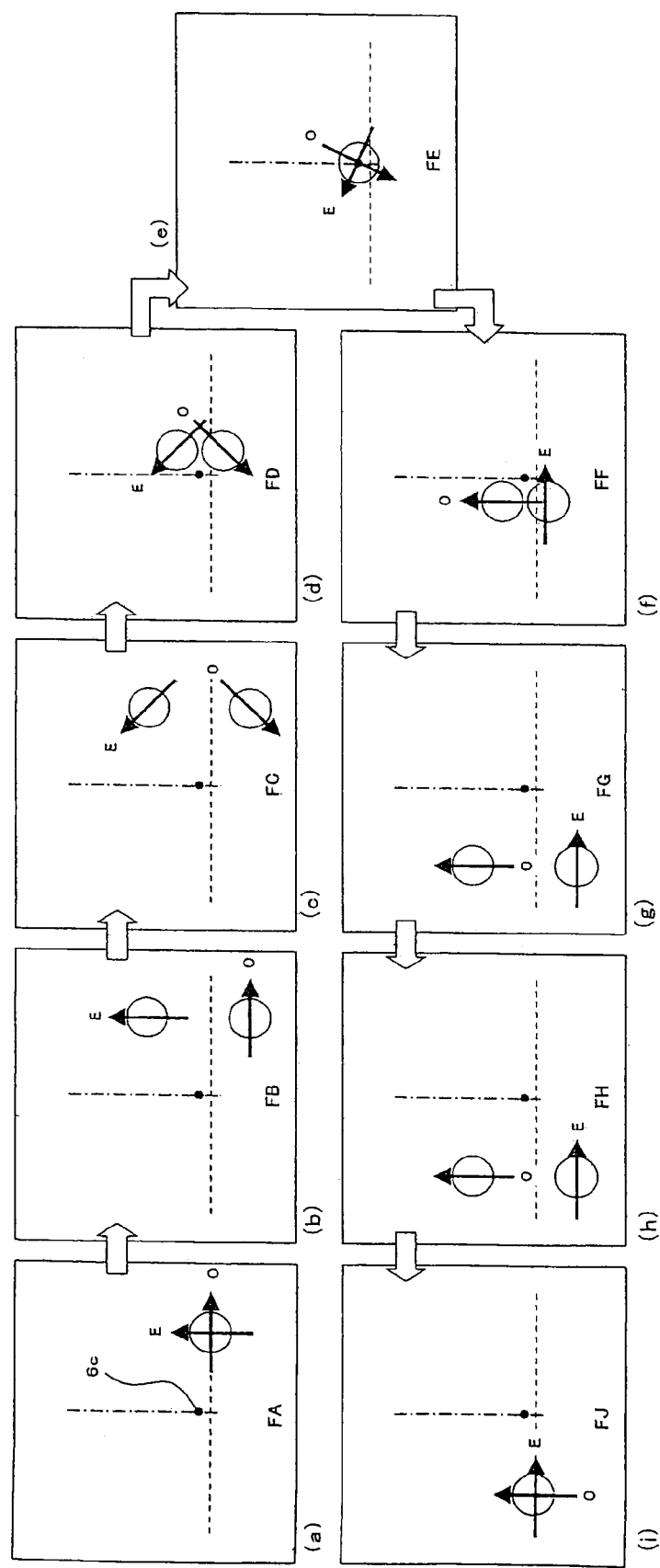
FIG. 6 is a state relation diagram that shows the state of polarization and the positional relation of the ordinary ray and the extraordinary ray propagating in the forward direction, at each position of an in-line optical isolator according to the second embodiment of the present invention.

Operation in the above configuration is described, when an optical signal (A) that has a wavelength of 1.55 [μm] propagates through the in-line optical isolator (20) in the forward direction. FIG. 5 shows the optical signal path of an optical signal (A) input from the optical fiber (10) in the forward direction. Also, FIG. 6(a)-(i) shows the state of polarization and the positional relation of the ordinary ray (O) and the extraordinary ray (E) of the optical signal (A) at each of the positions FA, FB, FC, FD, FE, FF, FG, FH and FJ shown in FIG. 5. As with said FIG. 2 and FIG. 4, FIG. 6 is illustrated to show a view of the rutile crystal (3) side as viewed from the optical fiber array (22) side, and the direction that is perpendicular to the page is the direction of the optical fibers (10, 11). In FIG. 6 also, the horizontal dotted line indicates a plane including the optical axes of the optical fibers (10, 11), and the vertical dashed line indicates a plane that passes through the center line (2c) between the optical axes of the optical fibers (10, 11) and is perpendicular to the plane including the optical axes of the optical fibers (10, 11).

As shown in FIG. 5, an optical signal (A) that has a wavelength of 1.55 [μm], which is input in the forward direction from the other end (10b) of the input optical fiber (10), is first input at a predetermined angle into the end face (3a) of the rutile crystal (3). FIG. 6(a) shows the state of polarization and the positional relation of the optical signal (A) at this time, and the ordinary ray (O) and the extraordinary ray (E) are intersecting perpendicularly. As described above, the crystal optical axis (3c) of the rutile crystal (3) is oriented in a direction that is perpendicular to the plane including the optical axes of the optical fibers (10, 11). Therefore, when the optical signal (A) passes through the rutile crystal (3), the extraordinary ray (E) is affected by the spatial shift effect (3d) from the ordinary ray (O), and the optical signal (A) is separated into ordinary ray (O) and extraordinary ray (E) in directions that are perpendicular to the plane including the optical axes of the optical fibers (10, 11), as shown in FIG. 6(b).

The separated ordinary ray (O) and extraordinary ray (E) are input into the end face (5a) of the half-wave plate (5) at a predetermined angle. Because the optical axis of the half-wave plate (5) is oriented at an angle of 22.5 degrees counterclockwise from the polarizing direction of the ordinary ray (O) in the state shown in FIG. 6(b), the polarizing directions of the ordinary ray (O) and the extraordinary ray (E) are rotated counterclockwise by 45 degrees, as shown in FIG. 6(c).

Next, the ordinary ray (O) and the extraordinary ray (E) are input into the focusing rod lens (26). At this time, the ordinary ray (O) and the extraordinary ray (E) are input in such positions that the rays are at a substantially equal distance above and below a plane that is parallel with the plane including the optical axes of the optical fibers (10, 11) and includes the focusing central optical axis (6c) of the focusing rod lens (6). At this time, the ordinary ray (O) and the extraordinary ray (E) are at a substantially equal distance from the focusing central optical axis (6c) of the focusing rod lens (26). In the focusing rod lens (26), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 6(d).

The ordinary ray (O) and the extraordinary ray (E), which are output from the end face of the lens of the focusing rod lens (26) then pass through the air gap (7) of about 200 [μm] and are input into the magnetized garnet crystal (8). The polarizing directions of the ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), but the positions of the ordinary ray (O) and the extraordinary ray (E) substantially coincide on this total reflecting mirror (9), as shown in FIG. 6(e).

The ordinary ray (O) and the extraordinary ray (E) reflected by the total reflecting mirror (9) become a reflected optical signal (A), which is again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be each rotated counterclockwise by 45 degrees and, together with the 45 degrees rotation at the half-wave plate (5), they will be rotated counterclockwise by 90 degrees as a result. This state is shown in FIG. 6(f).

Also, in a plane that passes through the focusing central optical axis (6c) of the focusing rod lens (26) and is perpendicular to the plane including the optical axes of the optical fibers (10, 11), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10, 11), the spatial positions of the ordinary ray (O) and the extraordinary ray (E) are interchanged across the focusing central optical axis (6c) of the focusing rod lens (26), from the optical fiber (10) side to the optical fiber (11) side.

Next, the ordinary ray (O) and the extraordinary ray (E), which are output from the magnetized garnet crystal (8), pass through the air gap (7) of about 200 [μm] and are input into the focusing rod lens (26). Due to the effects of the focusing rod lens (26), the ordinary ray (O) and the extraordinary ray (E) are converted to parallel rays and, as they propagate, move away from the focusing central optical axis (6c) as well as from each other. This state is shown in FIG. 6(g). Next, the ordinary ray (O) and the extraordinary ray (E)

pass through the quartz glass plate (4) but the polarizing directions of the rays are not affected. This state is shown in FIG. 6(*h*).

Next, the ordinary ray (O) and the extraordinary ray (E) are input into the end face (3*b*) of the rutile crystal (3) at a predetermined angle. In the rutile crystal (3), the ordinary ray (O) is affected by the spatial shift effect, because its polarizing direction has been rotated by 90 degrees and is parallel with the crystal optical axis (3*c*) of the rutile crystal (3). However, the extraordinary ray (E) passes through the rutile crystal (3) without being affected by the spatial shift effect, because its polarizing direction has been rotated by 90 degrees and is perpendicular to the crystal optical axis (3*c*) of the rutile crystal (3). Therefore, the ordinary ray (O) affected by the spatial shift effect recombines with the extraordinary ray (E), as shown in FIG. 6(*i*). The recombined ordinary ray (O) and extraordinary ray (E) enter the optical fiber (11) and are transmitted to an external optical signal path as a forward output optical signal.

Figure 7:
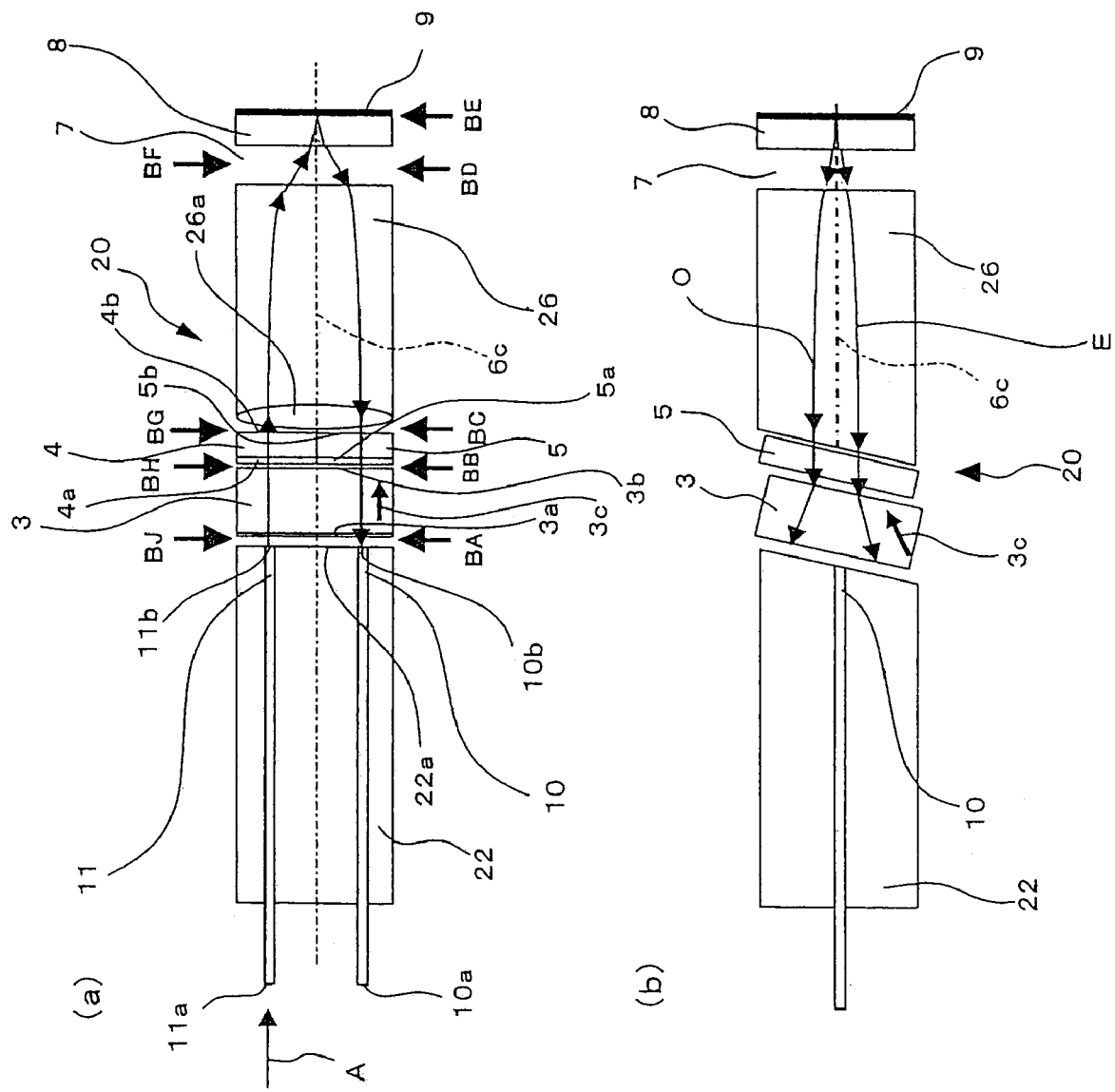
FIG. 7 shows the configuration of an in-line optical isolator according to the second embodiment of the present invention when an optical signal propagates in the reverse direction, and (a) is the plan view and (b) is the side view.
Figure 8:
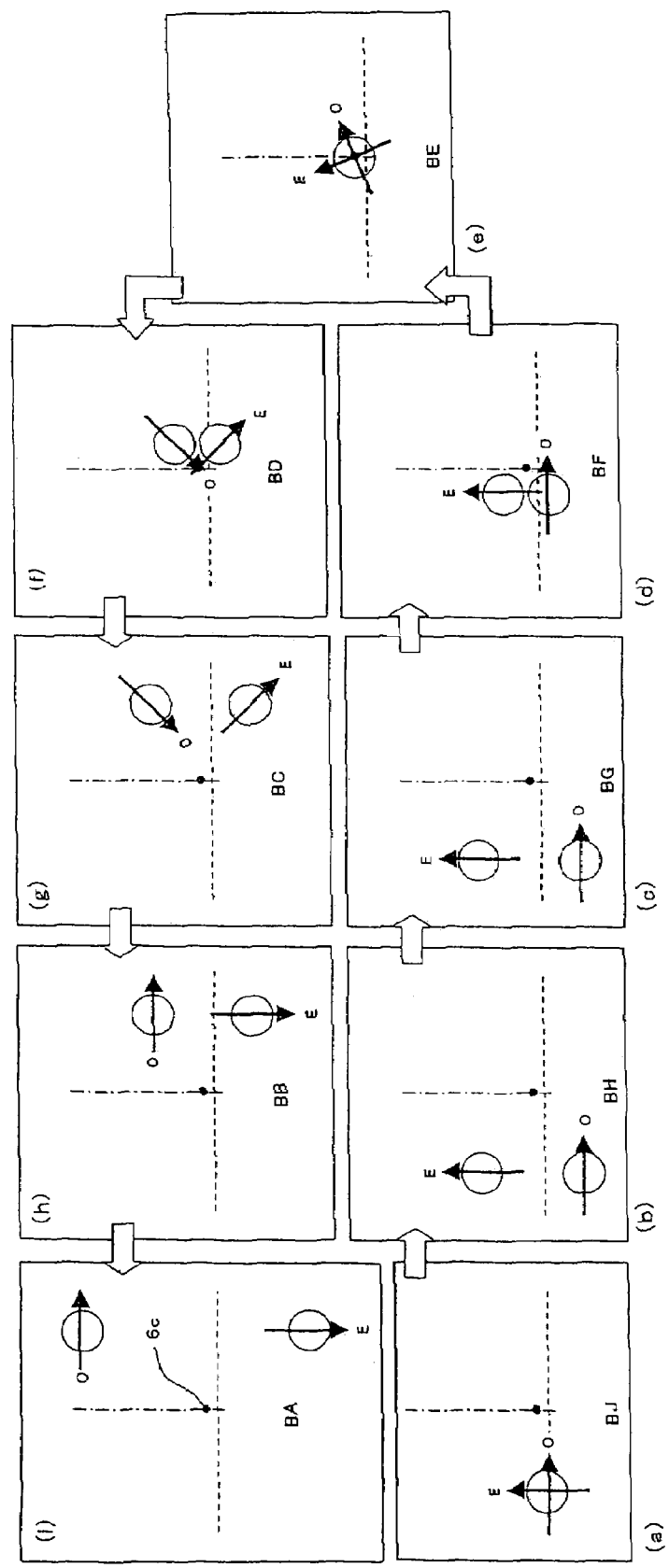
FIG. 8 is a state relation diagram that shows the state of polarization and the positional relation of the ordinary ray and the extraordinary ray propagating in the reverse direction, at each position of an in-line optical isolator according to the second embodiment of the present invention.

Next, an operation of the in-line optical isolator (20) is described, when an optical signal (A) that has a wavelength of 1.55 [μm] propagates through the in-line optical isolator (20) in the reverse direction. FIG. 7 shows the optical signal path of an optical signal (A) input from the optical fiber (11) in the reverse direction. FIG. 7(*a*) is the plan view of the in-line optical isolator (20) and FIG. 7(*b*) is the side view. In this figure, the parts that are identical to FIG. 5 are given identical codes and their descriptions are omitted. FIG. 8(*a*)-(*i*) shows the state of polarization and the positional relation of the ordinary ray (O) and the extraordinary ray (E) of the optical signal (A) at each of the positions BA, BB, BC, BD, BE, BF, BG, BH and BJ shown in FIG. 7. As with said FIG. 2, FIG. 4 and FIG. 6, FIG. 8 is illustrated to show a view of the rutile crystal (3) side as viewed from the optical fiber array (22) side, and the direction that is perpendicular to the page is the direction of the optical axes of the optical fibers (10, 11). In FIG. 8 also, the horizontal dotted line indicates a plane including the optical axes of the optical fibers (10, 11), and the vertical dashed line indicates a plane that passes through the center line (2*c*) between the optical axes of the optical fibers (10, 11) and is perpendicular to the plane including the optical axes of the optical fibers (10, 11). This plane includes the focusing central optical axis (6*c*) of the focusing rod lens (26).

As shown in FIG. 7, an optical signal (A) that has a wavelength of 1.55 [μm], which is output from the optical fiber (11) in the reverse direction, is first input into the end face (3*a*) of the rutile crystal (3) at a predetermined angle. FIG. 8(*a*) shows the state of the optical signal (A) at this time, and the ordinary ray (O) and the extraordinary ray (E) are intersecting perpendicularly. In the optical signal (A) input into the rutile crystal (3), as described above, the extraordinary ray (E) having a polarizing direction parallel with the crystal optical axis (3*c*) is affected in the rutile crystal (3) by the spatial shift effect from the ordinary ray (O) having a polarizing direction that is perpendicular to the crystal optical axis (3*c*), as shown in FIG. 8(*b*), and the ordinary ray (O) and the extraordinary ray (E) are separated in directions that are perpendicular to the plane including the optical axes of the optical fibers (10, 11). Next, the separated ordinary ray (O) and extraordinary ray (E) pass through the quartz glass plate (4), but the polarizing directions of the ordinary ray (O) and the extraordinary ray (E) are not affected and do not rotate. This state is shown in FIG. 8(*c*).

Next, the ordinary ray (O) and the extraordinary ray (E), which are output from the quartz glass plate (4), are input into the end face (26*a*) of the focusing rod lens (26) at a predetermined angle. At this time, the ordinary ray (O) and the extraordinary ray (E) are input in such positions that the rays are at a substantially equal distance above and below a plane that is parallel with the plane including the optical axes of the optical fibers (10, 11) and includes the focusing central optical axis (6*c*) of the focusing rod lens (26). At this time; the ordinary ray (O) and the extraordinary ray (E) are at a substantially equal distance from the focusing central optical axis (6*c*) of the focusing rod lens (26). In the focusing rod lens (26), the ordinary ray (O) and the extraordinary ray (E) are converted to parallel rays and, as they propagate, move closer to the focusing central optical axis (6*c*) as well as to each other, and are output from the end face of the lens at an output angle of about 1 degree. The state of the ordinary ray (O) and the extraordinary ray (E) is shown in FIG. 8(*d*).

The ordinary ray (O) and the extraordinary ray (E), which are output from the end face of the lens of the focusing rod lens (26), then pass through the air gap (7) of about 200 [μm] and are input into the magnetized garnet crystal (8). The polarizing directions of the ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), but the positions of the incident ordinary ray (O) and the extraordinary ray (E) substantially coincide on this total reflecting mirror (9), as shown in FIG. 8(*e*). Next, the ordinary ray (O) and the extraordinary ray (E) reflected by the total reflecting mirror (9) become a reflected optical signal (A), which is again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be rotated counterclockwise by 45 degrees as a result. This state is shown in FIG. 8(*f*).

Also, in a plane that passes through the focusing central optical axis (6*c*) of the focusing rod lens (26) and is perpendicular to the plane including the optical axes of the optical fibers (10, 11), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10, 11), the spatial positions of the ordinary ray (O) and the extraordinary ray (E) are interchanged across the focusing central optical axis (6*c*) of the focusing rod lens (26), from the optical fiber (11) side to the optical fiber (10) side.

Next, the ordinary ray (O) and the extraordinary ray (E), which are output from the magnetized garnet crystal (8), pass through the air gap (7) of about 200 [μm] and are input into the focusing rod lens (26). Due to the effects of the focusing rod lens (26), the ordinary ray (O) and the extraordinary ray (E) are converted to parallel rays and, as they propagate, move away from the focusing central optical axis (6*c*) as well as from each other. This state is shown in FIG. 8(*g*).

Next, the separated ordinary ray (O) and extraordinary ray (E) are input into the end face (5*b*) of the half-wave plate (5) at a predetermined angle, but because the optical axis of the half-wave plate (5) is oriented at an angle of −22.5 degrees with respect to the polarizing direction of the ordinary ray (O) in the state shown in FIG. 8(*g*), the polarizing directions of the ordinary ray (O) and the extraordinary ray (E) are rotated counterclockwise by 45 degrees. As a result, the −45 degrees rotating angle of polarizing direction rotated by the half-wave plate (5) and 45 degrees rotating angle of polarizing direction rotated by the magnetized garnet crystal (8) cancel out to make the sum of rotating angles of the polarizing directions of the ordinary ray (Q) and the extraordinary ray (E) 0 degrees. This state is shown in FIG. 8(h).

The ordinary ray (O) and the extraordinary ray (E), which have passed through the half-wave plate (5) are then input into the end face (3a) of the rutile crystal (3) at a predetermined angle. At this time, the ordinary ray (O) passes through the rutile crystal (3) without being affected by the spatial shift effect, because its polarizing direction is perpendicular to the crystal optical axis (3c) of the rutile crystal (3). Also, the extraordinary ray (E) is affected by the spatial shift effect and moves away from the ordinary ray (O), as shown in FIG. 8(i), because its polarizing direction is parallel with the crystal optical axis (3c) of the rutile crystal (3). As a result, the ordinary ray (O) and the extraordinary ray (E) are not recombined, and neither ray is input into the optical fiber (10) because each ray deviates from the optical fiber (10) by about 30 [μm]. Thus, isolation in the reverse direction is achieved.

According to such an in-line optical isolator (20) according to the second embodiment of the present invention, operational effects similar to the in-line optical isolator (1) according to the first embodiment can be obtained.

Furthermore, according to this in-line optical isolator (20) according to the second embodiment, because the end face (22a) of the optical fiber array (22) is formed at an angle of 8 degrees with respect to the axis that is perpendicular to the optical axes of the optical fibers (10, 11), the optical input/output end faces (3a, 3b, 5a, 5b) of the rutile crystal (3) and the half-wave plate (5) are arranged at the same inclination as the end face (22a) of the optical fiber array (22), and the end face (26a) of the focusing rod lens (26) facing the quartz glass plate (4) and the half-wave plate (5) is formed at an angle of 8 degrees so that it is substantially parallel with the end face (22a) of the optical fiber array (22), the reflected light generated when the optical signal (A) output from the optical fiber (10) and the reflected optical signal (A) reflected by the total reflecting mirror (9) are reflected by the optical input/output end faces (3a, 3b, 5a, 5b) of the rutile crystal (3) and the half-wave plate (5) and the end face (26a) of the focusing rod lens (26), will not return to its original propagation direction and will not be input into the optical fiber (10). Thus, the effects of reflected light will be reduced, which is generated when the optical signal (A) output from the optical fiber (10) and the reflected optical signal (A) reflected by the total reflecting mirror (9) are reflected by the optical input/output end faces (3a, 3b, 5a, 5b). Therefore, reflected light will be less frequently input into the optical equipment connected to the optical fiber (10), and reflected light will not become a noise in the optical equipment when the optical signal propagates in the forward direction.

It should be noted that, although a case was described in the above embodiment is where a half-wave plate (5) was arranged on the side that an optical signal (A) output from optical fiber (10) passed through, the half-wave plate (5) may also be arranged on the side that a reflected optical signal (A) reflected by the total reflecting mirror (9) passes through. Furthermore, it is also possible to use, in place of a quartz glass plate (4) and paired with a half-wave plate (5), a medium that does not rotate the polarizing direction.

Also, although magnetized garnet crystal was used as a non-reciprocal polarization plane rotating device, other media may be used as long as it is a non-reciprocal polarization plane rotating device that rotates the polarizing direction by 22.5 degrees at the optical signal wavelength to be used. For example, it is possible to employ a configuration in which a non-reciprocal polarization plane rotating device is covered by a magnetic substance, i.e. provide a magnet on the outside of anon-magnetized, non-reciprocal polarization plane rotating device to apply a predetermined magnetic field to the device. Furthermore, although focusing rod lens (6, 26) of diffraction distribution type was used as a light collecting means, many different light collecting means can be used in cases where optical signal (A) input from the optical fiber (10) is separated by the rutile crystal (3) into ordinary ray (O) and extraordinary ray (E), as long as crystal optical axis (3c) of rutile crystal (3) is oriented so that the separation directions of the ordinary ray (O) and the extraordinary ray (E) intersect perpendicularly with a plane including the optical axes of the optical fibers (10, 11) perpendicularly and the ordinary ray (O) and the extraordinary ray (E) are each arranged at a substantially equal distance from the center optical axes of the lens.

Also, although a case was described in the above second embodiment where the end face (22a) of the optical fiber array (22), optical input/output end faces (3a, 3b, 4a, 4b, 5a, 5b) of the rutile crystal (3), the quartz glass plate (4) and the half-wave plate (5) and the end face (26a) of the focusing rod lens (26) are arranged at an angle of 8 degrees with a plane that is perpendicular to the optical axes of the optical fibers (10, 11), these end faces may also be arranged at an angle between 3 degrees and 16 degrees, in which case operational effects similar to the second embodiment can be also obtained.

Next, the third embodiment is described, where an in-line optical isolator according to the present invention is applied to a fiber-optic communication system.

FIG. 9(a) is the plan view of a polarization-independent multifiber optical isolator (30) according to this embodiment and FIG. 9(b) is the side view. The polarization-independent multifiber optical isolator (30) is configured with the following elements aligned in the stated order: an optical fiber array (32), a rutile crystal (3), a quartz glass plate (4) and a half-wave plate (5), a focusing rod lens (6), an air gap (7), a magnetized garnet crystal (8) and a total reflecting mirror (9).

In the optical fiber array (32), two pairs of optical fibers, the optical fibers (10, 11) and the optical fibers (12, 13), whose optical axes are parallel with each other, are arranged in parallel and integrated at equal intervals of 250 [μm] in the same plane. One optical fiber of each pair (10, 12) comprises an input optical fiber that inputs a forward optical signal and the other optical fiber of each pair (11, 13) comprises an output optical fiber that outputs the forward optical signal that is input from the optical fibers (10, 12). One end (10a, 11a, 12a, 13a) of the optical fibers (10, 11, 12, 13) is fixed by a multifiber ferrule or a single fiber ferrule not shown in the figure, and is connected through the optical fiber array (32) to an optical signal path comprised of optical fibers. Also, the other end (10b, 11b, 12b, 13b) of the optical fibers (10, 11, 12, 13) is arranged on the end face (32a) of the optical fiber array (32). This end face (32a) is perpendicular to the plane including each optical axis of the optical fibers (10-13) and is polished and formed perpendicular to each optical axis, and the optical input/output end faces (3a, 3b, 4a, 4b, 5a, 5b) of the rutile crystal (3), the quartz glass plate (4) and the half-wave plate (5) and the end face (6a) of the focusing rod lens (6) facing the quartz glass plate (4) and the half-wave plate (5) are each arranged substantially parallel with the end face (32a) of the optical fiber array (32).

The rutile crystal (3) is a 300 [μm]-thick birefringent crystal and comprises a polarization separation device, which separates an optical signal (A) and an optical signal (B) input from the forward direction into an ordinary ray (O) and an extraordinary ray (E). This rutile crystal (3) applies a spatial shift effect (3d) to the ordinary ray (O) and the extraordinary ray (E) of the optical signal (A) and the optical signal (B), which are polarized in a direction that is parallel with its crystal optical axis (3c). The crystal optical axis (3c) of rutile crystal (3) is oriented so that the separation directions of the ordinary ray (O) and the extraordinary ray (E) are perpendicular to a plane including the optical axes of the optical fibers (10-13) and arranged in a plane that is parallel with the optical axes of the optical fibers (10-13).

Between the rutile crystal (3) and the focusing rod lens (6), a half-wave plate (5) is provided, which is a polarization plane rotating device that rotates the polarizing directions of the ordinary ray (O) and the extraordinary ray (E) in the reverse direction depending on the propagating direction (forward or reverse), at a position where the optical signal (A) and the optical signal (B) input from the input optical fibers (10, 12) pass through. Also, a quartz glass plate (4), which is an amorphous optical device, is provided at a position where the reflected optical signal (A) and the reflected optical signal (B) input from the total reflecting mirror (9) pass through. The quartz glass plate (4), in forward operation, is arranged parallel with the half-wave plate (5) so that only the-optical signal (A) and the optical signal (B) input from the input optical fibers (10, 12) pass through the half-wave plate (5) and only the reflected optical signal (A) and the optical signal (B) reflected by the total reflecting mirror (9) pass through the quartz glass plate (4). The optical axis of the half-wave plate (5) is oriented at an angle of 22.5 degrees counterclockwise from the polarizing directions of the ordinary ray (O) propagating in the forward direction after being separated. When the optical signal (A) and the optical signal (B) propagate in the forward direction as indicated by an arrow in FIG. 11(a), the half-wave plate (5) rotates the polarizing directions of the ordinary ray (O) and the extraordinary ray (E) counterclockwise by 45 degrees each, and, when the optical signal (A) and the optical signal (B) propagate in the reverse direction, as indicated by an arrow in FIG. 11(a) to be described later, the half-wave plate (5) rotates the polarizing directions of the ordinary ray (O) and the extraordinary ray (E) clockwise by 45 degrees each.

The focusing rod lens (6), which is comprised of a diffraction distribution type rod lens with a phase difference of about π/2, comprises the light collecting means that changes the light collecting state of the ordinary ray (O) and the extraordinary ray (E). When the ordinary ray (O) and the extraordinary ray (E) are propagating in the forward direction, this focusing rod lens (6) converts these rays (O, E) to parallel rays and moves them closer to each other before collecting. When the ordinary ray (O) and the extraordinary ray (E) are propagating in the reverse direction, this focusing rod lens (6) converts these rays (O, E) to parallel rays on the end face (6a) side and moves them away from each other. Also, the focusing central optical axis (6c) of the focusing rod lens (6) is parallel with the optical axes of the optical fibers (10-13) and, is arranged on a plane that is perpendicular to the plane including the optical axes of the optical fibers (10-13) and includes the center line (2c) between the optical axes of the optical fibers (10-13). Also, this focusing central optical axis (6c) is arranged on the end face (6a) side at a substantially equal distance from the four rays, i.e. the ordinary ray (O) and the extraordinary ray (E) propagating along the optical axis of one optical fiber (10) of one pair and the ordinary ray (O) and the extraordinary ray (E) propagating along the optical axis of the other optical fiber (11) of one pair. Furthermore, the focusing central optical axis (6c) is also arranged at a substantially equal distance from the four rays, i.e. the ordinary ray (O) and the extraordinary ray (E) propagating along the optical axis of one optical fiber (12) of the other pair and the ordinary ray (O) and the extraordinary ray (E) propagating along the optical axis of the other optical fiber (13) of the other pair.

The magnetized garnet crystal (8) is magnetized in advance in this embodiment, and comprises a non-reciprocal polarization plane rotating device that constantly rotates the polarizing directions of the ordinary ray (O) and the extraordinary ray (E) counterclockwise by only 22.5 degrees, independent of the direction of propagation. Also, an air gap (7) of about 200 [μm] is provided as a heat insulating means between the focusing rod lens (6) and the magnetized garnet crystal (8). The total reflecting mirror (9) is formed by vapor deposition on the side of the magnetized garnet crystal (8) opposite the side facing the focusing rod lens (6). The total reflecting mirror (9) comprises a reflecting means, which reflects the ordinary ray (O) and the extraordinary ray (E) of an optical signal that is output from the magnetized garnet crystal (8) as a reflected optical signal and inputs this reflected optical signal back into the magnetized garnet crystal (8).

Figure 9:
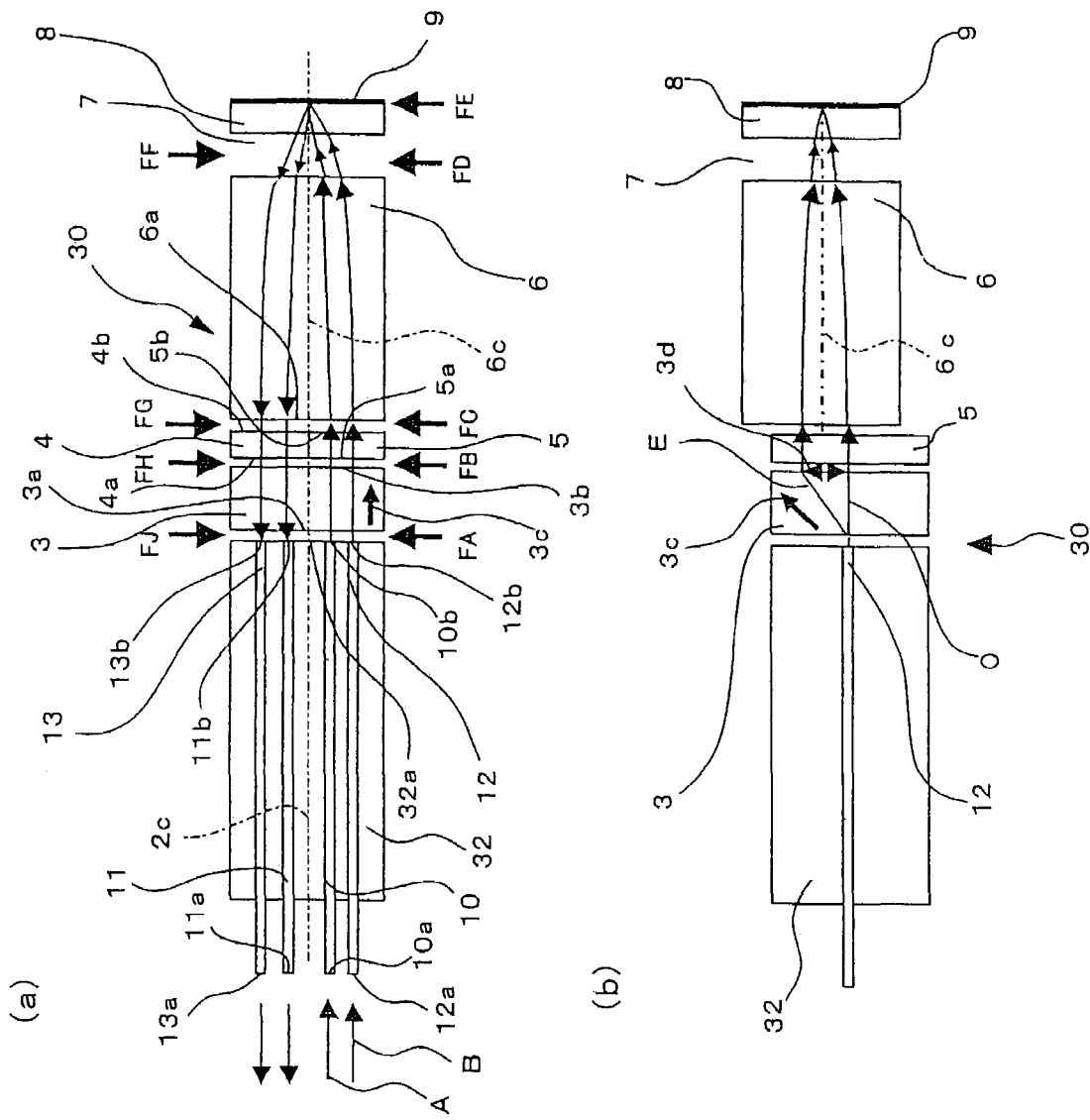
FIG. 9 shows the configuration of an in-line optical isolator according to the third embodiment of the present invention when an optical signal propagates in the forward direction, and (a) is the plan view and (b) is the side view.
Figure 10:
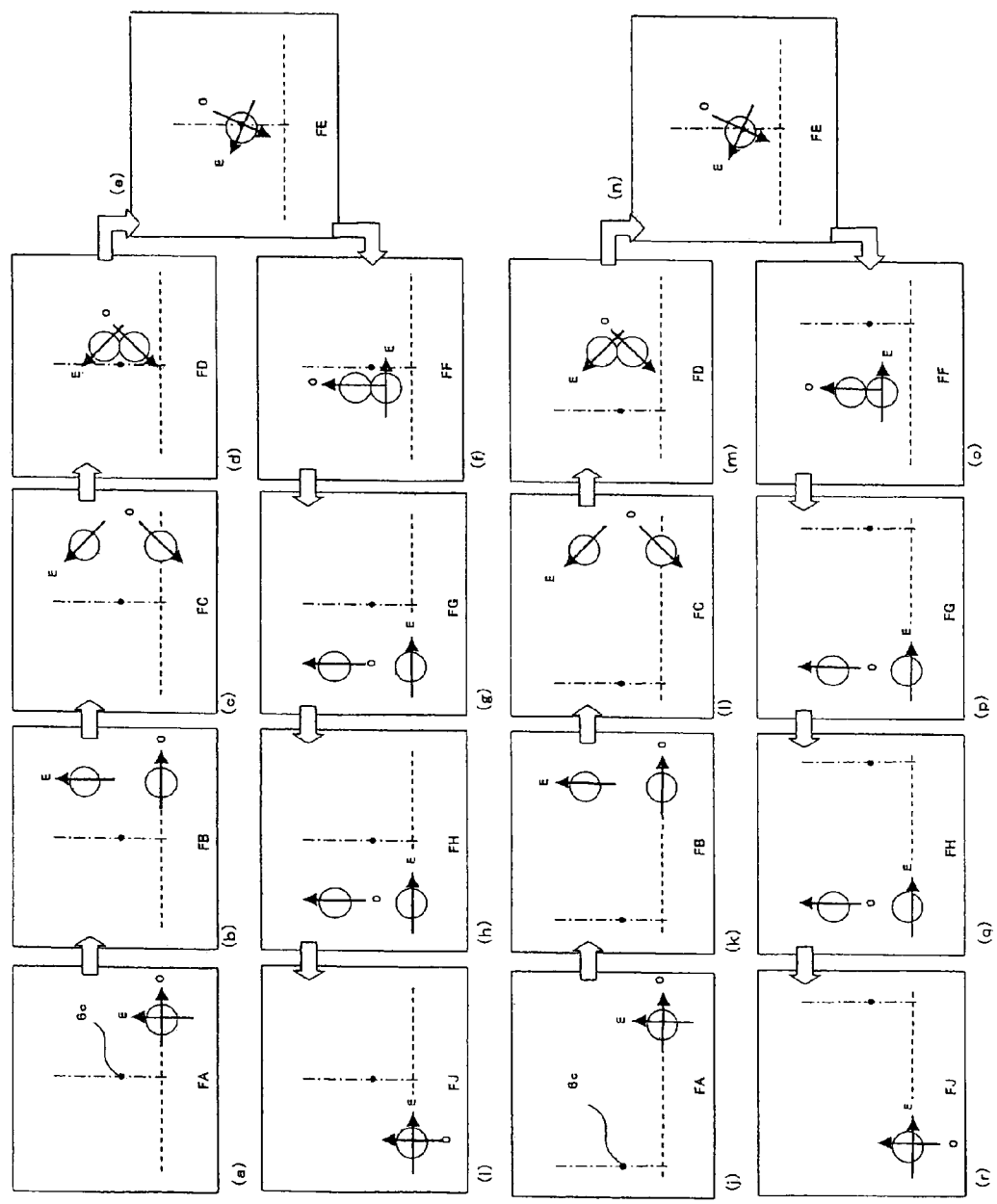
FIG. 10 is a state relation diagram that shows the state of polarization and the positional relation of the ordinary ray and the extraordinary ray propagating in the forward direction, at each position of an in-line optical isolator according to the third embodiment of the present invention.

Next, operation in the above configuration is described, when an optical signal (A) and an optical signal (B) that have a wavelength of 1.55 [μm] propagate through a polarization-independent multifiber optical isolator (30) in the forward direction. Said FIG. 9 shows the optical signal path of the optical signal (A) input from the optical fiber (10) in the forward direction and the optical signal path of the optical signal (B) input from the optical fiber (12) in the forward direction. Also, FIG. 10(a)-(i) shows the state of polarization and the positional relation of the ordinary ray (O) and the extraordinary ray (E) of the optical signal (A) at each of the positions FA, FB, FC, FD, FE, FF, FG FH and FJ shown in FIG. 9, and FIG. 10(j)-(r) shows the state of polarization and the positional relation of the ordinary ray (O) and the extraordinary ray (E) of the optical signal (B) at each of these positions. As with said FIG. 2, FIG. 4, FIG. 6 and FIG. 8, FIG. 10 is illustrated to show a view of the rutile crystal (3) side as viewed from the optical fiber array (32) side in FIG. 9, and the direction that is perpendicular to the page is the direction of the optical axes of the optical fibers (10-13). In FIG. 10 also, the horizontal dotted line indicates a plane including the optical axes of the optical fibers (10-13), and the vertical dashed line indicates a plane that passes through said center line (2c) of the optical fiber array (32) and is perpendicular to the plane including the optical axes of the optical fibers (10-13). This plane includes the focusing central optical axis (6c) of the focusing rod lens (6).

An optical signal (A) input in the forward direction from the other end (10b) of the optical fiber (10) is first input perpendicularly into the end face (3a) of the rutile crystal (3). FIG. 10(a) shows the state of polarization and the positional relation of the optical signal (A) at this time, and the ordinary ray (O) and the extraordinary ray (E) are intersecting perpendicularly. Because the crystal optical axis (3c) of the rutile crystal (3) is oriented in a direction that is perpendicular to the plane including the optical axes of the optical fibers (10-13) as described above, when the optical signal (A) passes through the rutile crystal (3), the extraordinary ray (E) having a polarizing direction parallel with the crystal optical axis (3c) is affected by the spatial shift effect (3d) from the ordinary ray (O) having a polarizing direction that is perpendicular to the crystal optical axis (3c), and the ordinary ray (O) and the extraordinary ray (E) are separated in directions that are perpendicular to the plane including the optical axes of the optical fibers (10-13), as shown in FIG. 10(b).

The separated ordinary ray (O) and extraordinary ray (E) are input perpendicularly into the end face (5a) of the half-wave plate (5). At this time, because the optical axis of the half-wave plate (5) is oriented at an angle of 22.5 degrees counterclockwise from the polarizing direction of the ordinary ray (O) in the state shown in FIG. 10(b), the polarizing directions of the ordinary ray (O) and the extraordinary ray (E) are each rotated counterclockwise by 45 degrees as shown in FIG. 10(c).

The ordinary ray (O) and the extraordinary ray (E), which have passed through the half-wave plate (5), are then input perpendicularly into the end face (6a) of the focusing rod lens (6). At this time, the ordinary ray (O) and the extraordinary ray (E) are input at such positions that the rays are at a substantially equal distance above and below a plane that is parallel with the plane including the optical axes of the optical fibers (10-13) and includes the focusing central optical axis (6c) of the focusing rod lens (6). At this time, the ordinary ray (O) and the extraordinary ray (E) are at a substantially equal distance from the focusing central optical axis (6c). In the focusing rod lens (6), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 10(d).

The ordinary ray (O) and the extraordinary ray (E), which are output from the end face of the lens of the focusing rod lens (6), then pass through the air gap (7) of about 200 [µm] and are input into the magnetized garnet crystal (8). The polarizing directions of the ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), but the positions of the ordinary ray (O) and the extraordinary ray (E) substantially coincide on this total reflecting mirror (9), as shown in FIG. 10(e).

Next, the ordinary ray (O) and the extraordinary ray (E), which are reflected by the total reflecting mirror (9), are again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be each rotated counterclockwise by 45 degrees and, together with the 45 degrees rotation at the half-wave plate (5), they will be rotated counterclockwise by 90 degrees as a result. This state is shown in FIG. 10(f).

Also, in a plane that passes through the focusing central optical axis (6c) of the focusing rod lens (6) and is perpendicular to the plane including the optical axes of the optical fibers (10-13), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10-13), the spatial positions of the ordinary ray (O) and the extraordinary ray (E) are interchanged across the focusing central optical axis (6c) of the focusing rod lens (6), from the optical fiber (10) side to the optical fiber (11) side.

Next, the ordinary ray (O) and the extraordinary ray (E), which are output from the magnetized garnet crystal (8), pass through the air gap (7) of about 200 [µm] and are input into the focusing rod lens (6). Due to the effects of the focusing rod lens (6), the ordinary ray (O) and the extraordinary ray (E) are converted to parallel rays and, as they propagate, move away from the focusing central optical axis (6c) as well as from each other. This state is shown in FIG. 10(g). Next, the ordinary ray (O) and the extraordinary ray (E) pass through the quartz glass plate (4), but the polarizing directions of the rays are not affected. This state is shown in FIG. 10(h).

Next, the ordinary ray (O) and the extraordinary ray (E) are input perpendicularly into the end face (3b) of the rutile crystal (3). In the rutile crystal (3), the ordinary ray (O) is affected by the spatial shift effect, because its polarizing direction has been rotated by 90 degrees and is parallel with the crystal optical axis (3c) of the rutile crystal (3). However, the extraordinary ray (E) passes through the rutile crystal (3) without being affected by the spatial shift effect, because its polarizing direction has been rotated by 90 degrees and is perpendicular to the crystal optical axis (3c) of the rutile crystal (3). Therefore, the ordinary ray (O) affected by the spatial shift effect recombines with the extraordinary ray (E), as shown in FIG. 10(i). The recombined ordinary ray (O) and extraordinary ray (E) are input into the optical fiber (11) and transmitted to an external optical signal path as a forward output optical signal.

Also, the optical signal (B) input in the forward direction from the other end (12b) of the optical fiber (12) propagates along an optical signal path similar to the optical signal (A) on the outside of the optical signal (A), as shown in FIG. 10(j) to (r). In other words, the optical signal (B) is first input perpendicularly into the end face (3a) of the rutile crystal (3). FIG. 10(j) shows the state of polarization and the positional relation of the optical signal (B) at this time, and the ordinary ray (O) and the extraordinary ray (E) are intersecting perpendicularly. After the ordinary ray (O) and the extraordinary ray (E) are separated in the rutile crystal (3) in directions that are perpendicular to the plane including the optical axes of the optical fibers (10-13) as shown in FIG. 10(k), they are each rotated counterclockwise by 45 degrees by the half-wave plate (5) as shown in FIG. 10(l). Next, the ordinary ray (O) and the extraordinary ray (E) that are input into the focusing rod lens (6) are converted and output from the end face of the lens as shown in FIG. 10(m). Then, after passing through the air gap (7), the ordinary ray (O) and the extraordinary ray (E) are input into the magnetized garnet crystal (8) and have their polarizing directions rotated counterclockwise by 22.5 degrees. Next, the ordinary ray (O) and the extraordinary ray (E) are reflected by the total reflecting mirror (9). As shown in FIG. 10(n), the positions of the ordinary ray (O) and the extraordinary ray (E) substantially coincide on this total reflecting mirror (9).

Next, the ordinary ray (O) and the extraordinary ray (E), which are reflected by the total reflecting mirror (9), are again further rotated counterclockwise by 22.5 degrees by this magnetized garnet crystal (8). This state is shown in FIG. 10(o). Thereafter, after passing through the air gap (7), the ordinary ray (O) and the extraordinary ray (E) are converted as shown in FIG. 10(p) by the effects of the focusing rod lens (6). Thereafter, the ordinary ray (O) and the extraordinary ray (E) then pass through the quartz glass plate (4) but the polarizing directions of the rays are not affected. This state is shown in FIG. 10(q). In the rutile crystal (3), the ordinary ray (O) and the extraordinary ray (E) recombine as shown in FIG. 10(r), because the ordinary ray (O) is affected by the spatial shift effect from the rutile crystal (3) but the extraordinary ray (E) passes through without being affected by the spatial shift effect. The recombined ordinary ray (O) and extraordinary ray (E) are input into the optical fiber (13) and transmitted to an external optical signal path as a forward output optical signal.

Figure 11:
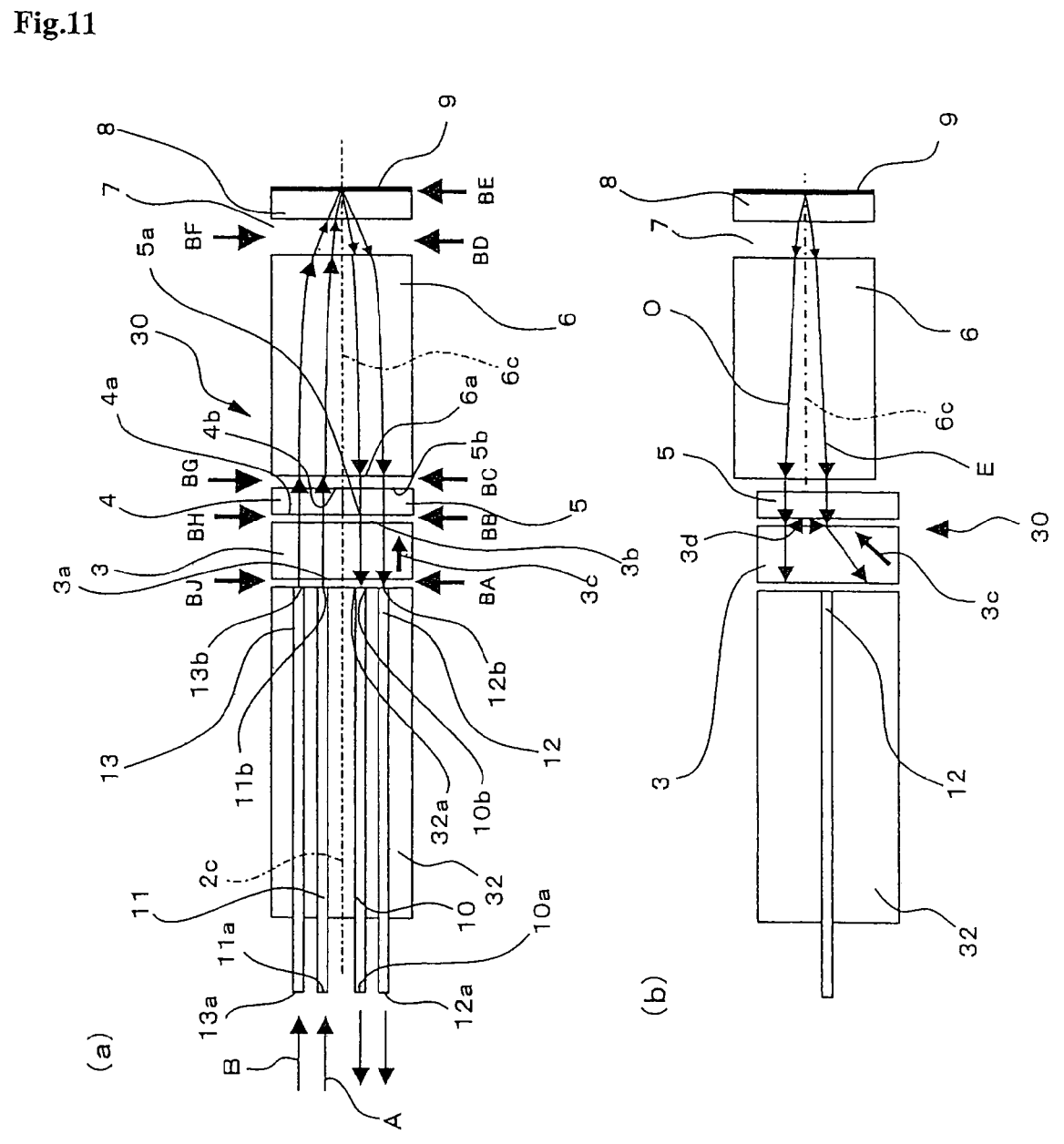
Figure 12:
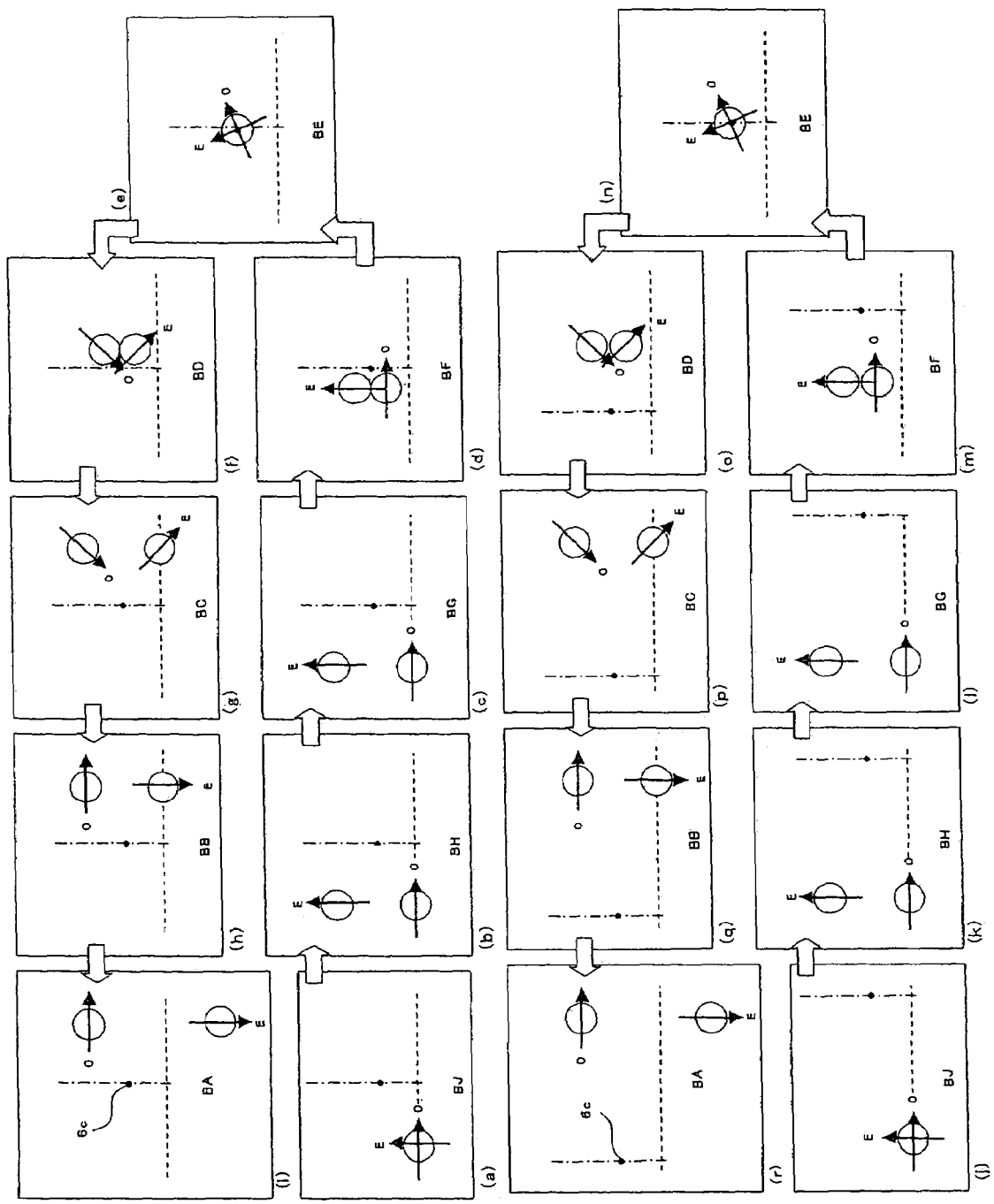
FIG. 12 is a state relation diagram that shows the state of polarization and the positional relation of the ordinary ray and the extraordinary ray propagating in the reverse direction, at each position of an in-line optical isolator according to the third embodiment of the present invention.

Next, operation in the above configuration is described, when an optical signal (A) and an optical signal (B) that has a wavelength of 1.55 [μm] propagates through a polarization-independent multifiber optical isolator (30) in the reverse direction. FIG. 11 shows the optical signal path of an optical signal (A) input from the optical fiber (11) in the reverse direction and the optical signal path of an optical signal (B) input from the optical fiber (13) in the reverse direction. FIG. 11(a) is the plan view of the polarization-independent multifiber optical isolator (30) and FIG. 11(b) is the side view. In this figure, the parts that are identical to FIG. 9 are given identical codes and their descriptions are omitted. Also, FIG. 12(a)-(i) shows the state of polarization and the positional relation of the ordinary ray (O) and the extraordinary ray (E) of the optical signal (A) at each of the positions BA, BB, BC, BD, BE, BF, BG, BH and BJ shown in FIG. 11, and FIG. 12(j)-(r) shows the state of polarization and the positional relation of the ordinary ray (O) and the extraordinary ray (E) of the optical signal (B) at each of these positions. As with said FIG. 10, FIG. 12 is illustrated to show a view of the rutile crystal (3) side as viewed from the optical fiber array (32) side, and the direction that is perpendicular to the page is the direction of the optical axes of the optical fibers (10-13). In FIG. 12 also, the horizontal dotted line indicates a plane including the optical axes of the optical fibers (10-13), and the vertical dashed line indicates a plane that passes through the center line (2c) of the optical fiber array (32) and is perpendicular to the plane including the optical axes of the optical fibers (10-13). This plane includes the focusing central optical axis (6c) of the focusing rod lens (6).

As shown in FIG. 11, an optical signal (A) that has a wavelength of 1.55 [μm], which is input in the reverse direction from the other end (11b) of the optical fiber (11), is first input into the end face (3a) of the rutile crystal (3) perpendicularly. FIG. 12(a) shows the state of the optical signal (A) at this time, and the ordinary ray (O) and the extraordinary ray (E) are intersecting perpendicularly. In the optical signal (A) input into the rutile crystal (3), as described above, the extraordinary ray (E) having a polarizing direction parallel with the crystal optical axis (3c) is affected in the the rutile crystal (3) by the spatial shift effect (3d) from the ordinary ray (O) having a polarizing direction that is perpendicular to the crystal optical axis (3c), as shown in FIG. 12(b), and the ordinary ray (O) and the extraordinary ray (E) are separated in directions that are perpendicular to the plane including the optical axes of the optical fibers (10-13). Next, the separated ordinary ray (O) and extraordinary ray (E) pass through the quartz glass plate (4), but the polarizing directions of the ordinary ray (O) and the extraordinary ray (E) are not affected and do not rotate. This state is shown in FIG. 12(c).

Next, the ordinary ray (O) and the extraordinary ray (E), which are output from the quartz glass plate (4), are input perpendicularly into the end face (6a) of the focusing rod lens (6). At this time, the ordinary ray (O) and the extraordinary ray (E) are input in such positions that the rays are at a substantially equal distance above and below a plane that is parallel with the plane including the optical axes of the optical fibers (10-13) and includes the focusing central optical axis (6c) of the focusing rod lens (6). At this time, the ordinary ray (O) and the extraordinary ray (E) are at a substantially equal distance from the focusing central optical axis (6c) of the focusing rod lens (6). In the focusing rod lens (6), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 12(d).

The ordinary ray (O) and the extraordinary ray (E), which are output from the end face of the focusing rod lens (6), then pass through the air gap (7) of about 200 [μm] and are input into the magnetized garnet crystal (8). The polarizing directions of the incident ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), and the positions of the ordinary ray (O) and the extraordinary ray (E) substantially coincide on this total reflecting mirror (9), as shown in FIG. 12(e). Next, the ordinary ray (O) and the extraordinary ray (E) reflected by the total reflecting mirror (9) become a reflected optical signal (A), which is again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be rotated counterclockwise by 45 degrees as a result. This state is shown in FIG. 12(f).

Also, in a plane that passes through the focusing central optical axis (6c) of the focusing rod lens (6) and is perpendicular to the plane including the optical axes of the optical fibers (10-13), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10-13), the spatial positions of the ordinary ray (O) and the extraordinary ray (E) are interchanged across the focusing central optical axis (6c) of the focusing rod lens (6), from the optical fiber (11) side to the optical fiber (10) side.

Next, the ordinary ray (O) and the extraordinary ray (E), which are output from the magnetized garnet crystal (8), pass through the air gap (7) of about 200 [μm] and are input into the focusing rod lens (6). Due to the effects of the focusing rod lens (6), the ordinary ray (O) and the extraordinary ray (E) are converted to parallel rays and, as they propagate, move away from the focusing central optical axis (6c) as well as from each other. This state is shown in FIG. 12(g).

Next, the separated ordinary ray (O) and extraordinary ray (E) are input perpendicularly into the end face (5b) of the half-wave plate (5), but, because the optical axis of the half-wave plate (5) is oriented at an angle of −22.5 degrees with respect to the polarizing direction of the ordinary ray (Q) in the state shown in FIG. 12(g), the polarizing directions of the ordinary ray (O) and the extraordinary ray (E) are rotated counterclockwise by 45 degrees. As a result, the 45 degrees rotating angle of polarizing direction rotated by the half-wave plate (5) and the 45 degrees rotating angle of polarizing direction rotated by the magnetized garnet crystal (8) cancel out to make the sum of rotating angles of the polarizing directions of the ordinary ray (O) and the extraordinary ray (E) 0 degrees. This state is shown in FIG. 12(h).

The ordinary ray (9) and the extraordinary ray (E), which have passed through the half-wave plate (5), are input perpendicularly into the end face (3b) of the rutile crystal (3). At this time, the ordinary ray (O) passes through the rutile crystal (3) without being affected by the spatial shift effect, because its polarizing direction is perpendicular to the crystal optical axis (3c) of the rutile crystal (3). Also, the extraordinary ray (E) is affected by the spatial shift effect and moves away from the ordinary ray (O), as shown in FIG. 12(i), because its polarizing direction is parallel with the crystal optical axis (3c) of the rutile crystal (3). As a result, the ordinary ray (O) and the extraordinary ray (E) are not recombined, and neither ray is input into the optical fiber (10) because each ray deviates from the optical fiber (10) by about 30 [μm]. Thus, isolation in the reverse direction is achieved for the optical signal (A).

Also, the optical signal (B) input in the reverse direction from the other end (13b) of the optical fiber (13) propagates along an optical signal path similar to the optical signal (A) on the outside of the optical signal (A), as shown in FIG. 12(j) to (r). In other words, the optical signal (B) is first input perpendicularly into the end face (3a) of the rutile crystal (3). FIG. 12(j) shows the state of polarization and the positional relation of the optical signal (B) at this time, and the ordinary ray (O) and the extraordinary ray (E) are intersecting perpendicularly. The ordinary ray (O) and the extraordinary ray (E) are separated in the rutile crystal (3) in directions that are perpendicular to the plane including the optical axes of the optical fibers (10-13) as shown in FIG. 12(k). The separated ordinary ray (O) and the extraordinary ray (E) pass through the quartz glass plate (4) with no change in polarizing directions as shown in FIG. 12(l), and are converted by the focusing rod lens (6) as shown in FIG. 12(m). Then, after passing through the air gap (7), the ordinary ray (Q) and the extraordinary ray (E) have their polarizing directions rotated counterclockwise by 22.5 degrees by the magnetized garnet crystal (8), and then are reflected by the total reflecting mirror (9). As shown in FIG. 12(n), the positions of the ordinary ray (O) and the extraordinary ray (E) substantially coincide on this total reflecting mirror (9).

Next, the ordinary ray (O) and the extraordinary ray (E), which are reflected by the total reflecting mirror (9), are again further rotated counterclockwise by 22.5 degrees by this magnetized garnet crystal (8). This state is shown in FIG. 12(o). Then, after passing through the air gap (7), the ordinary ray (O) and the extraordinary ray (E) are converted as shown in FIG. 12(p) by the effects of the focusing rod lens (6). Thereafter, the ordinary ray (O) and the extraordinary ray (E) are each rotated counterclockwise by −45 degrees by the half-wave plate (5) as shown in FIG. 12(q). Thereafter, in the rutile crystal (3), the ordinary ray (O) and the extraordinary ray (E) are not recombined and are not input into the optical fiber (12), as shown in FIG. 12(r), because the ordinary ray (O) passes through without being affected by the spatial shift effect but the extraordinary ray (E) is affected by the spatial shift effect from the rutile crystal (3). Thus, isolation in the reverse direction is achieved for the optical signal (B).

According to such a polarization-independent multifiber optical isolator (30) according to the third embodiment of the present invention, as described, in the optical signal (A) and the optical signal (B) that are input in the forward direction from the optical fibers (10-13), the ordinary rays (O) and the extraordinary rays (E) are separated in the rutile crystal (3) in directions that are perpendicular to the plane including the optical axes of two pairs of optical fibers, the optical fibers (10, 11) and the optical fibers (12, 13) and parallel with these optical axes. Also, at the end face (6a) of focusing rod lens (6), the optical axes of these ordinary ray (O) and extraordinary ray (E) are substantially parallel with their focusing central optical axis (6c) of the focusing rod lens (6) and at a substantially equal distance from the focusing central optical axis (6c). Also, the optical axes of these ordinary ray (O) and extraordinary ray (E) of the reflected optical signal reflected by the total reflecting mirror (9), at the end face (6a) of the focusing rod lens (6), are also substantially parallel with the focusing central optical axis (6c) and positioned at a substantially equal distance from the focusing central optical axis (6c) and, in the rutile crystal (3), the ordinary ray (O) and the extraordinary ray (E) recombine in a direction that is perpendicular to the plane including the optical axes of the two pairs of optical fibers, the optical fibers (10, 11) and the optical fibers (12, 13), and parallel with these optical axes. Thus, the number of optical signal paths can be adjusted by only changing the number of pairs of the input optical fiber and the output optical fiber, without changing the functional components that perform common functions in multiple optical isolators, such as the rutile crystal (3), the half-wave plate (5), the focusing rod lens (6), the magnetized garnet crystal (8) and the total reflecting mirror (9). Therefore, functional components do not increase in size when the number of optical signal paths is increased. Furthermore, there is no need to replace functional components when the number of optical signal paths is increased, and a polarization-independent multifiber optical isolator (30) is provided, which does not require a lot of time and effort to modify. Also, between one pair of optical fibers (10, 11) and between the other pair of optical fibers (12, 13), there is substantially no difference between the optical path lengths of the ordinary ray (O) and the extraordinary ray (E) propagating to the rutile crystal (3) where recombination occurs, and there is substantially no occurrence of polarization mode dispersion. Therefore, there is substantially no difference (0.01 [psec] or less) between the ordinary ray (O) and the extraordinary ray (E) in the time required to propagate to the rutile crystal (3). Thus, when applying this polarization-independent multifiber optical isolator (30) to high-speed optical transmission equipment with transmission rates of 10 [Gb/s] or higher, there will be no constraint such as the number of units that can be used.

In the above embodiment also, the effects of the half-wave plate (5) and the quartz glass plate (4) on optical signals do not change when their positions are interchanged, and it is therefore possible to interchange their positions. In other words, it suffices that the half-wave plate (5) is arranged at a position where either the optical signal (A) and the optical signal (B) or the reflected optical signal (A) and the reflected optical signal (B) pass through and the quartz glass plate (4) is arranged at a position where the other pass through, between the rutile crystal (3) and the focusing rod lens (6). In either arrangement, the optical signal (A) input from the optical fiber (10) and the optical signal (B) input from the optical fiber. (12) either have their polarizing directions rotated by 45 degrees by the half-wave plate (5) immediately after their ordinary ray (O) and extraordinary ray (E) are separated at the rutile crystal (3) or, have their polarizing directions rotated by 45 degrees by the half-wave plate (5) after the rays are separated at the rutile crystal (3) and reflected by the total reflecting mirror (9).

In the above embodiment also, even if iron component of the magnetized garnet crystal (8) absorbs light that has a wavelength of 0.98 [μm] and generates heat, this heat is prevented from conducting to the focusing rod lens (6) adjacent to the magnetized garnet crystal (8), because an air gap (7) of about 200 [μm] is provided between the focusing rod lens (6) and the magnetized garnet crystal (8). Thus, adhesive and the like, which bond the magnetized garnet crystal (8) and the adjacent focusing rod lens (6), will not degenerate and its characteristics will not change due to rise in temperature from heat generation. Light that has a wavelength of 0.98 [μm] and an output power of 100 [mW] was actually irradiated for 24 hours, and it was confirmed that the characteristics did not change before and after the irradiation.

In the above embodiment also, the side of the magnetized garnet crystal (8) opposite the side facing the focusing rod lens (6) functions as a total reflecting mirror (9) as is, because the total reflecting mirror (9) is formed by vapor deposition on the side of the magnetized garnet crystal (8) opposite the side facing the focusing rod lens (6). Thus, there is no need to newly provide a separate reflecting means adjacent to the magnetized garnet crystal (8), and a polarization-independent multifiber optical isolator (30) can be configured compactly.

In the above embodiment also, because the magnetized garnet crystal (8) is magnetized in advance, polarizing direction of an optical signal passing through the magnetized garnet crystal (8) can be rotated by its magnetic field. Thus, there is no need to provide a device that applies a magnetic field to the magnetized garnet crystal (8) from the outside, and a polarization-independent multifiber optical isolator (30) can be configured compactly.

Next, fourth embodiment is described, where a polarization-independent multifiber optical isolator (40) according to the present invention is applied to a fiber-optic communication system.

FIG. 13(a) is the plan view of a polarization-independent multifiber optical isolator (40) according to this embodiment and FIG. 13(b) is the side view. In the following description of the polarization-independent multifiber optical isolator (40) according to this embodiment, the constituent elements that are identical or equivalent to the constituent elements of the polarization-independent multifiber optical isolator (30) according to the third embodiment are given the same codes and their descriptions are omitted.

The polarization-independent multifiber optical isolator (40) is configured with the following elements aligned in the stated Order: an optical fiber array (42), a rutile crystal (3), a quartz glass plate (4) and a half-wave plate (5), a focusing rod lens (26), an air gap (7), a magnetized garnet crystal (8) and a total reflecting mirror (9). In the optical fiber array (42), as with the third embodiment, two pairs of optical fibers, the optical fibers (10, 11) and the optical fibers (12, 13), whose optical axes are parallel with each other, are arranged in parallel and integrated at equal intervals of 250 [μm] in the same plane.

In the polarization-independent multifiber optical isolator (40) in this embodiment, the end face (42a) of optical fiber array (42) is formed at an angle of 8 degrees with a plane that is perpendicular to the optical axes of the optical fibers (10-13), and optical input/output end faces (3a, 3b, 4a, 4b, 5a, 5b) of the rutile crystal (3), the quartz glass plate (4) and the half-wave plate (5) are arranged parallel with the end face (42a) of optical fiber array (42), i.e. at an angle of 8 degrees. Furthermore, the end face (26a) of the focusing rod lens (26) facing the quartz glass plate (4) and the half-wave plate (5) is formed at an angle of 8 degrees so that it is parallel with the end face (42a) of the optical fiber array (42). And, the optical axis of the half-wave plate (5) is aligned for an input optical signal (A) and an input optical signal (B) entering obliquely at an angle of 8 degrees. Configurations not described above are the same as in the polarization-independent multifiber optical isolator (30) in the third embodiment.

Figure 13:
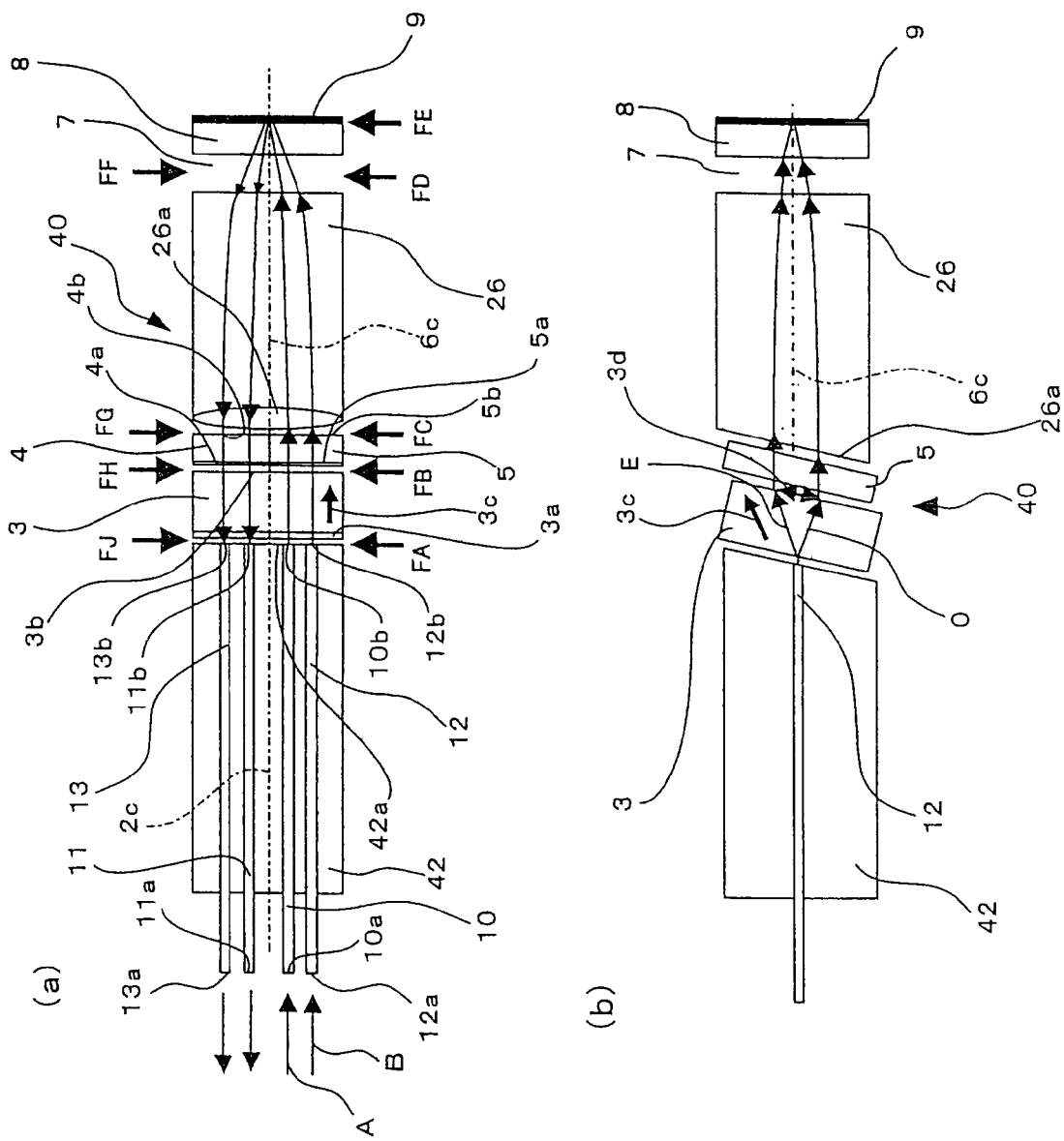
FIG. 13 shows the configuration of an in-line optical isolator according to the fourth embodiment of the present invention when an optical signal propagates in the forward direction, and (a) is the plan view and (b) is the side view.
Figure 14:
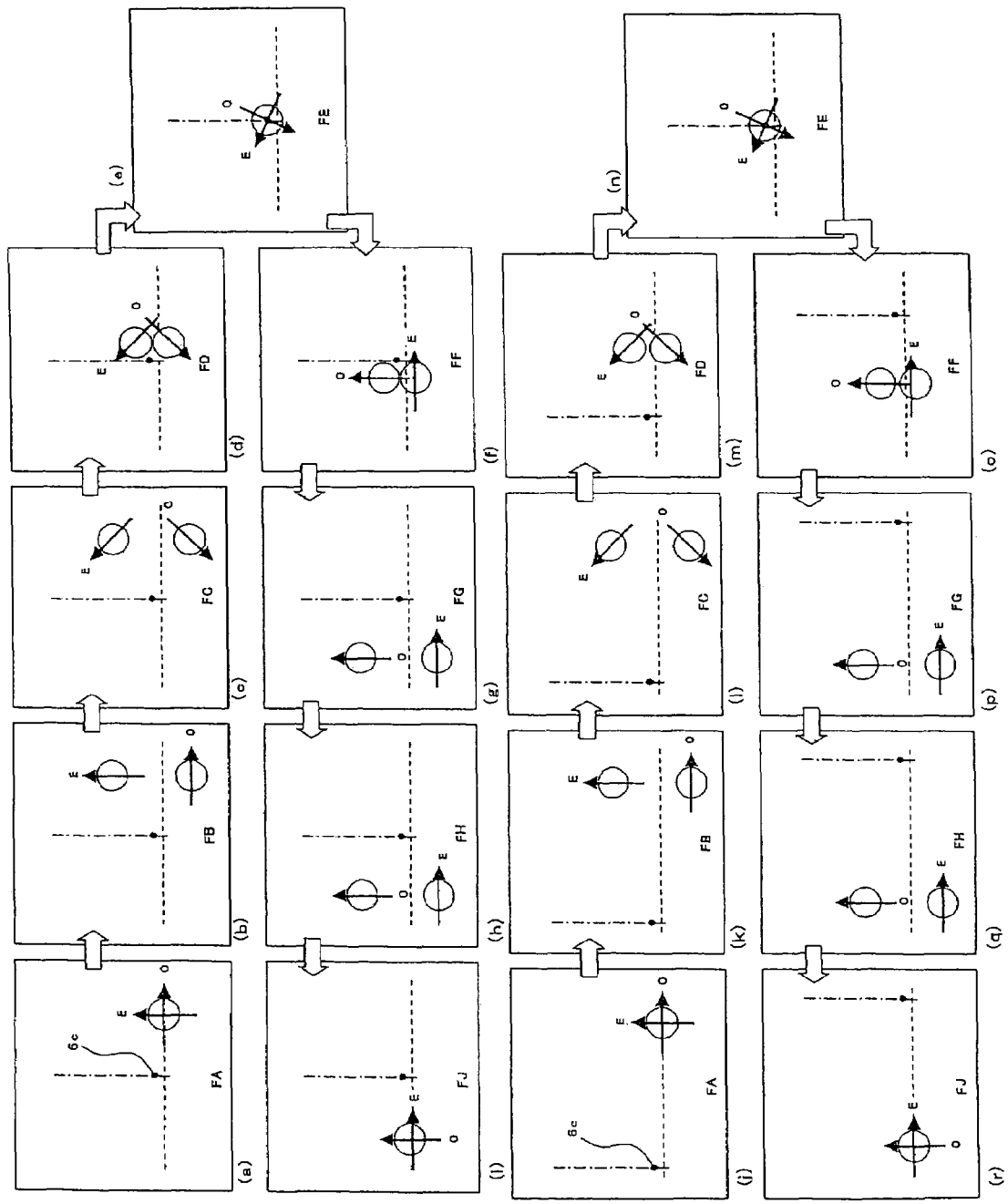
FIG. 14 is a state relation diagram that shows the state of polarization and the positional relation of the ordinary ray and the extraordinary ray propagating in the forward direction, at each position of an in-line optical isolator according to the fourth embodiment of the present invention.

Next, operation in the above configuration is described, when an optical signal (A) and an optical signal (B), which have a wavelength of 1.55 [μm], propagate through a polarization-independent multifiber optical isolator (40) in the forward direction. Said FIG. 13 shows the optical signal path of an optical signal (A) input from the optical fiber (10) in the forward direction and the optical signal path of an optical signal (B) input from the optical fiber (12) in the forward direction. Also, FIG. 14(a)-(i) shows the state of polarization and the positional relation of the ordinary ray (O) and the extraordinary ray (E) of the optical signal (A) at each of the positions FA, FB, FC, FD, FE, FF, FG, FH and FJ shown in FIG. 13, and FIG. 14(j)-(r) shows the state of polarization and the positional relation of the ordinary ray (O) and the extraordinary ray (E) of the optical signal (B) at each of these positions. As with said FIG. 10 and FIG. 12, FIG. 14 is illustrated to show a view of the rutile crystal (3) side as viewed from the optical fiber array (42) side, and the direction that is perpendicular to the page is the direction of the optical axes of the optical fibers (10-13). In FIG. 14 also, the horizontal dotted line indicates a plane including the optical axes of the optical fibers (10-13), and the vertical dashed line indicates a plane that passes through the center line (2c) of the optical fiber array (42) and is perpendicular to the plane including the optical axes of the optical fibers (10-13). This plane includes the focusing central optical axis (6c) of the focusing rod lens (26).

As shown in FIG. 13, an optical signal (A) input in the forward direction from the other end (10b) of the input optical fiber (10) is first input at a predetermined angle into the end face (3a) of the rutile crystal (3). FIG. 14(a) shows the state of polarization and the positional relation of the optical signal (A) at this time, and the ordinary ray (O) and the extraordinary ray (E) are intersecting perpendicularly. Because the crystal optical axis (3c) of the rutile crystal (3) is oriented in a direction that is perpendicular to the plane including the optical axes of the optical fibers (10-13) as described above, when the optical signal (A) passes through the rutile crystal (3), the extraordinary ray (E) having a polarizing direction parallel with the crystal optical axis (3c) is affected by the spatial shift effect (3d) from the ordinary ray (O) having a polarizing direction that is perpendicular to the crystal optical axis (3c), and the ordinary ray (O) and the extraordinary ray (E) are separated in directions that are perpendicular to the plane including the optical axes of the optical fibers (10-13), as shown in FIG. 14(b).

The separated ordinary ray (O) and extraordinary ray (E) are input at a predetermined angle into the end face (5a) of the half-wave plate (5). At this time, because the optical axis of the half-wave plate (5) is oriented at an angle of 22.5 degrees counterclockwise from the polarizing direction of the ordinary ray (O) in the state shown in FIG. 14(b), the polarizing directions of the ordinary ray (O) and the extraordinary ray (E) are rotated counterclockwise by 45 degrees as shown in FIG. 14(c).

Next, the ordinary ray (O) and the extraordinary ray (E) are input into the end face (26a) of the focusing rod lens (26). At this time, the ordinary ray (O) and the extraordinary ray (E) are input in such positions that the rays are at a substantially equal distance above and below a plane that is parallel with the plane including the optical axes of the optical fibers (10-13) and includes the focusing central optical axis (6c) of the focusing rod lens (26). At this time, the ordinary ray (O) and the extraordinary ray (E) are at a substantially equal distance from the focusing central optical axis (6c). In the focusing rod lens (26), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray (O) and the extraordinary ray (E) is shown in FIG. 14(*d*).

The ordinary ray (O) and the extraordinary ray (E), which are output from the end face of the focusing rod lens (26), then pass through the air gap (7) of about 200 [μm] and are input into the magnetized garnet crystal (8). The polarizing directions of the ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), and the positions of the ordinary ray (O) and the extraordinary ray (E) substantially coincide on this total reflecting mirror (9), as shown in FIG. 14(*e*).

The ordinary ray (O) and the extraordinary ray (E), which are reflected by the total reflecting mirror (9), are again input into the magnetized garnet crystal (8) and further rotated counterclockwise by 22.5 degrees by this magnetized garnet crystal (8). By passing back and forth through the magnetized garnet crystal (8), the polarizing directions of the ordinary ray (O) and the extraordinary ray (E) will be each rotated counterclockwise by 45 degrees and, together with the 45 degrees rotation at the half-wave plate (5), they will be rotated counterclockwise by 90 degrees as a result. This state is shown in FIG. 14(*f*).

Also, in a plane that passes through the focusing central optical axis (6c) of the focusing rod lens (26) and is perpendicular to the plane including the optical axes of the optical fibers (10-13), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10-13), the spatial positions of the ordinary ray (O) and the extraordinary ray (E) are interchanged across the focusing central optical axis (6c) of the focusing rod lens (26), from the optical fiber (10) side to the optical fiber (11) side.

Next, the ordinary ray (O) and the extraordinary ray (E), which are output from the magnetized garnet crystal (8), pass through the air gap (7) of about 200 [μm] and are input into the focusing rod lens (26). Due to the effects of the focusing rod lens (26), the ordinary ray (O) and the extraordinary ray (E) are converted to parallel rays and, as they propagate, move away from: the focusing central optical axis (6c) as well as from each other. This state is shown in FIG. 14(*g*). Next, the ordinary ray (O) and the extraordinary ray (E) pass through the quartz glass plate (4) but the polarizing directions of the rays are not affected. This state is shown in FIG. 14(*h*).

Next, the ordinary ray (O) and the extraordinary ray (E) are input into the end face (3b) of the rutile crystal (3) at a predetermined angle. In the rutile crystal (3), the ordinary ray (O) is affected by the spatial shift effect, because its polarizing direction has been rotated by 90 degrees and is parallel with the crystal optical axis (3c) of the rutile crystal (3). However, the extraordinary ray (E) passes through the rutile crystal (3) without being affected by the spatial shift effect, because its polarizing direction has been rotated by 90 degrees and is perpendicular to the crystal optical axis (3c) of the rutile crystal (3). Therefore, the ordinary ray (O) affected by the spatial shift effect recombines with the extraordinary ray (E), as shown in FIG. 14(*i*). The recombined ordinary ray (O) and extraordinary ray (E) are input into the optical fiber (11) and transmitted to an external optical signal path as a forward output optical signal.

Also, the optical signal (B) input in the forward direction from the other end (12b) of the optical fiber (12) propagates along an optical signal path similar to the optical signal (A) on the outside of the optical signal (A), as shown in FIG. 14(*j*) to (*r*). In other words, the optical signal (B) is first input at a predetermined angle into the end face (3a) of the rutile crystal (3). FIG. 14(*j*) shows the state of polarization and the positional relation of the optical signal (B) at this time, and the ordinary ray (O) and the extraordinary ray (E) are intersecting perpendicularly. After the ordinary ray (O) and the extraordinary ray (E) are separated in the rutile crystal (3) in directions that are perpendicular to the plane including the optical axes of the optical fibers (10-13) as shown in FIG. 14(*k*), they are each rotated counterclockwise by 45 degrees by the half-wave plate (5) as shown in FIG. 14(*l*). Next, the ordinary ray (O) and the extraordinary ray (E), which input into the focusing rod lens (26), are converted and output from the end face of the lens as shown in FIG. 14(*m*). Then, after passing through the air gap (7), the ordinary ray (O) and the extraordinary ray (E) are input into the magnetized garnet crystal (8) and have their polarizing directions rotated counterclockwise by 22.5 degrees. Next, the ordinary ray (O) and the extraordinary ray (E) are reflected by the total reflecting mirror (9). As shown in FIG. 14(*n*), the positions of the ordinary ray (O) and the extraordinary ray (E) substantially coincide on this total reflecting mirror (9).

Next, the ordinary ray (O) and the extraordinary ray (E), which are reflected by the total reflecting mirror (9), are again further rotated counterclockwise by 22.5 degrees by this magnetized garnet crystal (8). This state is shown in FIG. 14(*o*). Then, after passing through the air gap (7), the ordinary ray (O) and the extraordinary ray (E) are converted as shown in FIG. 14(*p*) by the effects of the focusing rod lens (26). After that, the ordinary ray (O) and the extraordinary ray (E) then pass through the quartz glass plate (4) but the polarizing directions of the rays are not affected. This state is shown in FIG. 14(*q*). In the rutile crystal (3), the ordinary ray (O) and the extraordinary ray (E) recombine as shown in FIG. 14(*r*), because the ordinary ray (O) is affected by the spatial shift effect from the rutile crystal (3) but the extraordinary ray (E) passes through without being affected by the spatial shift effect. The recombined ordinary ray (O) and extraordinary ray (E) are input into the optical fiber (13) and transmitted to an external optical signal path as a forward output optical signal.

Figure 15:
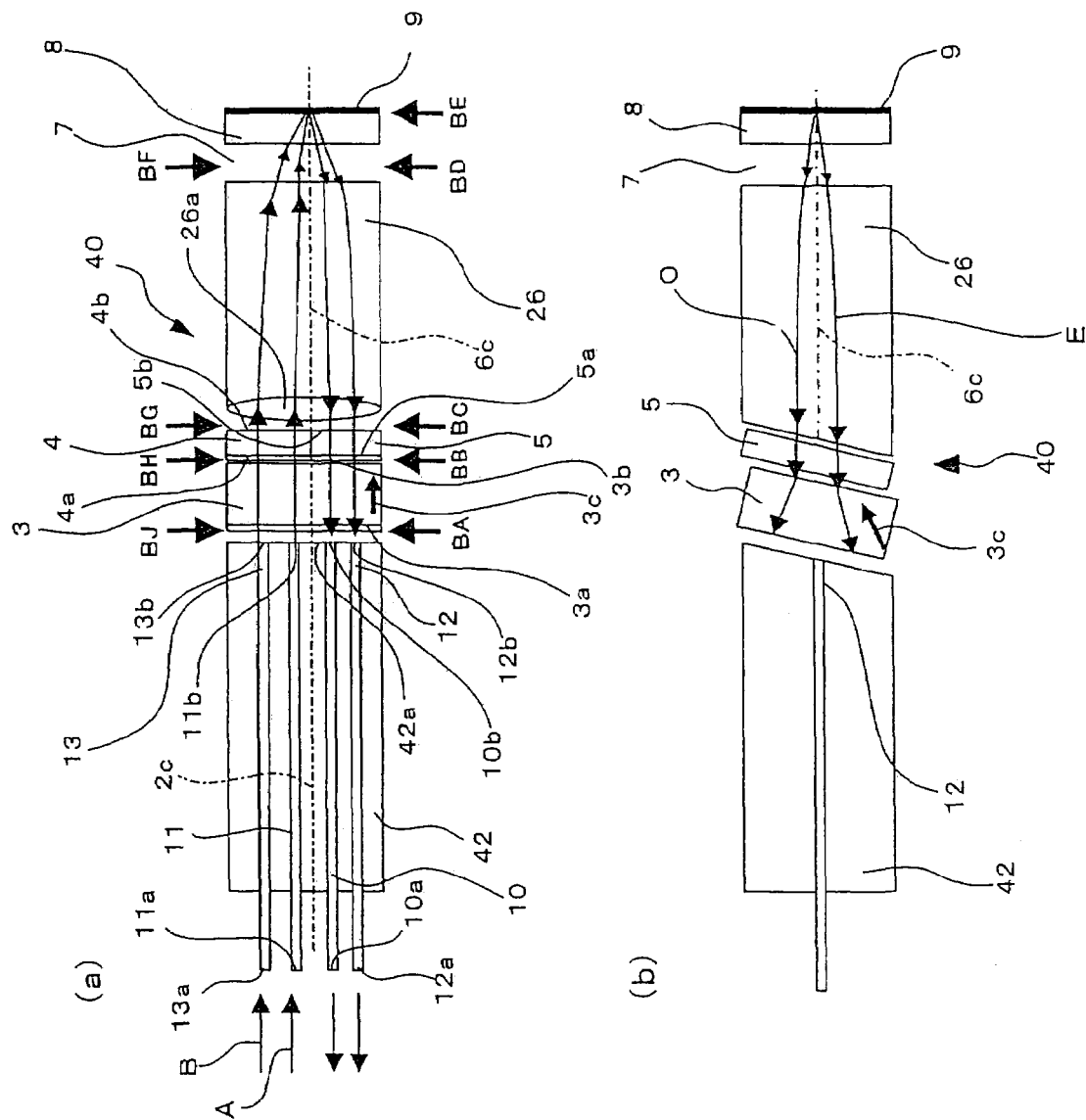
FIG. 15 shows the configuration of an in-line optical isolator according to the fourth embodiment of the present invention when an optical signal propagates in the reverse direction, and (a) is the plan view and (b) is the side view.
Figure 16:
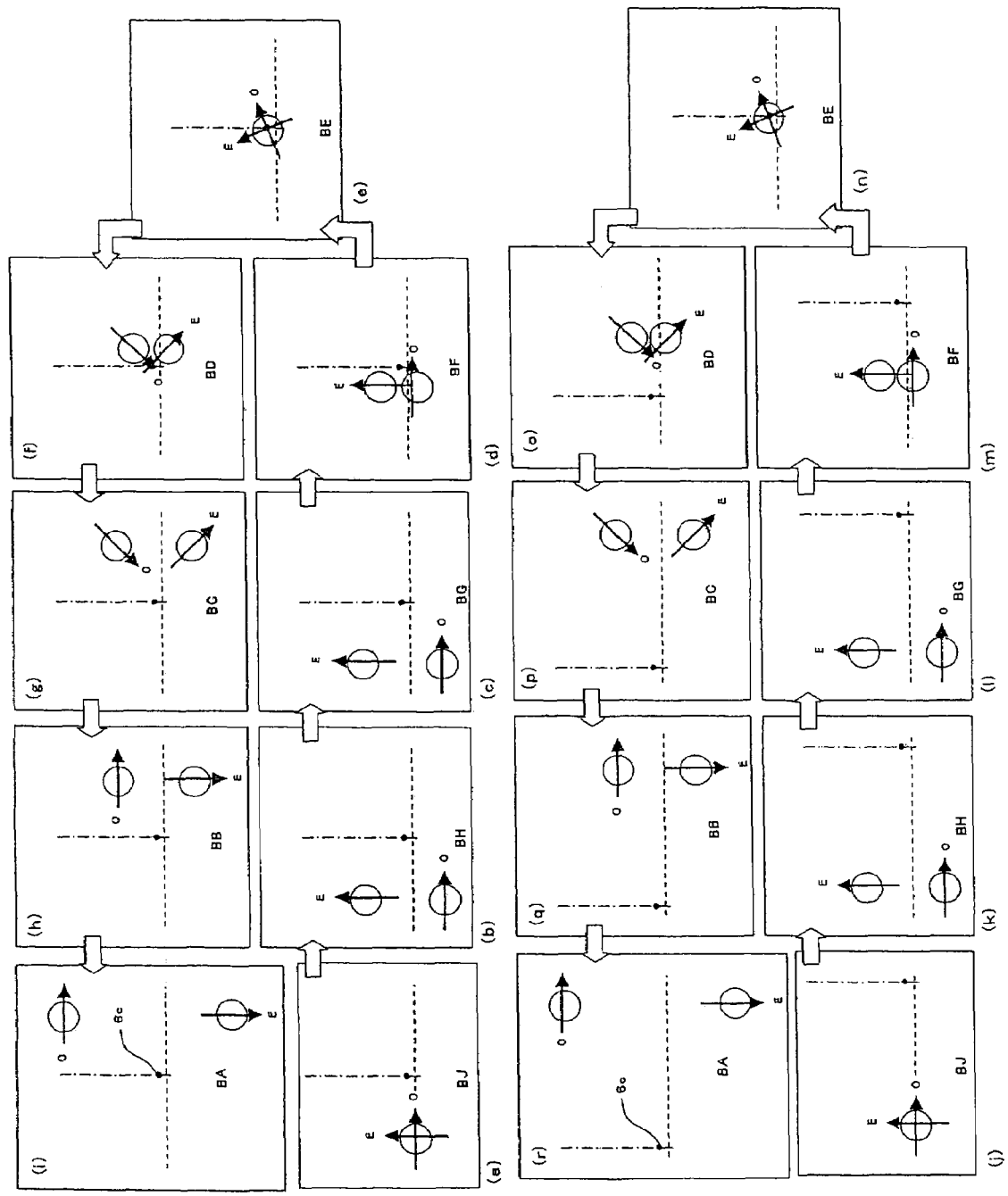
FIG. 16 is a state relation diagram that shows the state of polarization and the positional relation of the ordinary ray and the extraordinary ray propagating in the reverse direction, at each position of an in-line optical isolator according to the fourth embodiment of the present invention.

Next, operation in the above configuration is described, when an optical signal (A) and an optical signal (B), which have a wavelength of 1.55 [μm], propagate through a polarization-independent multifiber optical isolator (40) in the reverse direction. FIG. 15 shows the optical signal path of an optical signal (A) input from the optical fiber (11) in the reverse direction and the optical signal path of an optical signal (B) input from the optical fiber (13) in the reverse direction. FIG. 15(*a*) is the plan view of the polarization-independent multifiber optical isolator (40) and FIG. 15(*b*) is the side view. In this figure, the parts that are identical to FIG. 13 are given identical codes and their descriptions are omitted. Also, FIG. 16(*a*)-(*i*) shows the state of polarization and the positional relation of the ordinary ray (O) and the extraordinary ray (E) of the optical signal (A) at each of the positions BA, BB, BC, BD, BE, BF, BG, BH and BJ shown in FIG. 15, and FIG. 16(j)-(r) shows the state of polarization and the positional relation of the ordinary ray (O) and the extraordinary ray (E) of the optical signal (B) at each of these positions. As with said FIG. 10, FIG. 12 and FIG. 14, FIG. 16 is illustrated to show a view of the rutile crystal (3) side as viewed from the optical fiber array (42) side, and the direction that is perpendicular to the page is the direction of the optical axes of the optical fibers (10-13). In FIG. 16 also, the horizontal dotted line indicates a plane including the optical axes of the optical fibers (10-13), and the vertical dashed line indicates a plane that passes through the center line (2c) of the optical fiber array (42) and is perpendicular to the plane including the optical axes of the optical fibers (10-13). This plane includes the focusing central optical axis (6c) of the focusing rod lens (26).

As shown in FIG. 15, an optical signal (A) that has a wavelength of 1.55 [μm], which is output in the reverse direction from the optical fiber (11), is first input into the end face (3a) of the rutile crystal (3) at a predetermined angle. FIG. 16(a) shows the state of the optical signal (A) at this time, and the ordinary ray (O) and the extraordinary ray (E) are intersecting perpendicularly. In the optical signal (A) input into the rutile crystal (3), the extraordinary ray (E) having a polarizing direction parallel with the crystal optical axis (3c) is affected by the spatial shift effect from the ordinary ray (O) having a polarizing direction that is perpendicular to the crystal optical axis (3c), as shown in FIG. 16(b), and the, ordinary ray (O) and the extraordinary ray (E) are separated in directions that are perpendicular to the plane including the optical axes of the optical fibers (10-13). Next, the separated ordinary ray (O) and extraordinary ray (E) pass through the quartz glass plate (4), but the polarizing directions of the ordinary ray (O) and the extraordinary ray (E) are not affected and do not rotate. This state is shown in FIG. 16(c).

Next, the ordinary ray (O) and the extraordinary ray (E), which are output from the quartz glass plate (4), are input at a predetermined angle into the end face (26a) of the focusing rod lens (26). At this time, the ordinary ray (O) and the extraordinary ray (E) are input in such positions that the rays are at a substantially equal distance above and below a plane that is parallel with the plane including the optical axes of the optical fibers (10-13) and includes the focusing central optical axis (6c) of the focusing rod lens (26). At this time, the ordinary ray (O) and the extraordinary ray (E) are at a substantially equal distance from the focusing central optical axis (6c) of the focusing rod lens (26). In the focusing rod lens (26), the ordinary ray (O) and the extraordinary ray (E) are converted to parallel rays and, as they propagate, move closer to the focusing central optical axis (6c) as well as to each other, and are output from the end face of the lens at an output angle of about 1 degree. The state of the ordinary ray. (O) and the extraordinary ray (E) is shown in FIG. 16(d).

The ordinary ray (O) and the extraordinary ray (E), which are output from the end face of the focusing rod lens (26), then pass through the air gap (7) of about 200 [μm] and are input into the magnetized garnet crystal (8). The polarizing directions of the incident ordinary ray (O) and the extraordinary ray (E) are rotated counterclockwise by 22.5 degrees by this magnetized garnet crystal (8). The optical signal (A) from the magnetized garnet crystal (8) is then reflected by the total reflecting mirror (9), and the positions of the ordinary ray (O) and the extraordinary ray (E) substantially coincide on this total reflecting mirror (9), as shown in FIG. 16(e). Next, the ordinary ray (O) and the extraordinary ray (E) reflected by the total reflecting mirror (9) are again input into the magnetized garnet crystal (8) and further rotated counterclockwise by 22.5 degrees by this magnetized garnet crystal (8). By passing back and forth through the magnetized garnet crystal (8), the polarizing directions of the rays (O, E) will be rotated counterclockwise by 45 degrees as a result. This state is shown in FIG. 16(f).

Also, in a plane that passes through the focusing central optical axis (6c) of the focusing rod lens (26) and is perpendicular to the plane including the optical axes of the optical fibers (10-13), the physical positions of the ordinary ray (O) and the extraordinary ray (E) are interchanged by reflection at the total reflecting mirror (9), but the state of polarization of each ray remains the same as before the reflection. Also, in a plane that is parallel with the plane including the optical axes of the optical fibers (10, 11), the spatial positions of the ordinary ray (O) and the extraordinary ray (E) are interchanged across the focusing central optical axis (6c) of the focusing rod lens (26), from the optical fiber (11) side to the optical fiber (10) side.

Next, the ordinary ray (O) and the extraordinary ray (E), which are output from the magnetized garnet crystal (8), pass through the air gap (7) of about 200 [μm] and are input into the focusing rod lens (26). Due to the effects of the focusing rod lens (26), the ordinary ray (O) and the extraordinary ray (E) are converted to parallel rays and, as they propagate, move away from the focusing central optical axis (6c) as well as from each other. This state is shown in FIG. 16(g).

Next, the separated ordinary ray (O) and extraordinary ray (E) are input into the end face (5b) of the half-wave plate (5) at a predetermined angle, but, because the optical axis of the half-wave plate (5) is oriented at an angle of −22.5 degrees with respect to the polarizing direction of the ordinary ray (O) in the state shown in FIG. 16(g), the polarizing directions of the ordinary ray (O) and the extraordinary ray (E) are rotated counterclockwise by 45 degrees. As a result, the 45 degrees rotating angle of polarizing direction rotated by the half-wave plate (5) and the 45 degrees rotating angle of polarizing direction rotated by the magnetized garnet crystal (8) cancel out to make the sum of rotating angles of the polarizing directions of the ordinary ray (O) and the extraordinary ray (E) 0 degrees. This state is shown in FIG. 16(h).

The ordinary ray (O) and the extraordinary ray (E), which have passed through the half-wave plate (5), are then input into the end face (3b) of the rutile crystal (3) at a predetermined angle. At this time, the ordinary ray (O) passes through the Futile crystal (3) without being affected by the spatial shift effect, because its polarizing direction is perpendicular to the crystal optical axis (3c) of the rutile crystal (3). Also, the extraordinary ray (E) is affected by the spatial shift effect and moves away from the ordinary ray (O), as shown in FIG. 16(i), because its polarizing direction is parallel with the crystal optical axis (3c) of the rutile crystal (3). As a result, the ordinary ray (O) and the extraordinary ray (E) are not recombined, and neither ray is input into the optical fiber (10) because each ray deviates from the optical fiber (10) by about 30 [μm]. Thus, isolation in the reverse direction is achieved for the optical signal (A).

Also, the optical signal (B) input in the reverse direction from the other end (13b) of the optical fiber (13) propagates along an optical signal path similar to the optical signal (A) on the outside of the optical signal (A), as shown in FIG. 16(j)-(r). In other words, the optical signal (B) is first input at a predetermined angle into the end face (3a) of the rutile crystal (3). FIG. 16(j) shows the state of polarization and the positional relation of the optical signal (B) at this time, and the ordinary ray (O) and the extraordinary ray (E) are intersecting perpendicularly. The ordinary ray (O) and the extraordinary ray (E) are separated in the rutile crystal (3) in directions that are perpendicular to the plane including the optical axes of the optical fibers (10-13) as shown in FIG. 16(k). The separated ordinary ray (O) and the extraordinary ray (E) pass through the quartz glass plate (4) with no change in polarizing directions as shown in FIG. 16(l), and are converted by the focusing rod lens (26) as shown in FIG. 16(m). Then, after passing through the air gap (7), the ordinary ray (O) and the extraordinary ray (E) are input into the magnetized garnet crystal (8) and have their polarizing directions rotated counterclockwise by 22.5 degrees, and then are reflected by the total reflecting mirror (9). As shown in FIG. 16(n), the positions of the ordinary ray (O) and the extraordinary ray (E) substantially coincide on this total reflecting mirror (9).

Next, the ordinary ray (O) and the extraordinary ray (E), which are reflected by the total reflecting mirror (9), are again further rotated counterclockwise by 22.5 degrees by this magnetized garnet crystal (8). This state is shown in FIG. 16(o). Then, after passing through the air gap (7), the ordinary ray (O) and the extraordinary ray (E) are converted as shown in FIG. 16(p) by the effects of the focusing rod lens (26). Thereafter, the ordinary ray (O) and the extraordinary ray (E) are each rotated counterclockwise by 45 degrees by the half-wave plate (5) as shown in FIG. 16(q). Thereafter, in the rutile crystal (3), the ordinary ray (O) and the extraordinary ray (E) are not recombined and are not input into the optical fiber (12), as shown in FIG. 16(r), because the ordinary ray (O) passes through without being affected by the spatial shift effect but the extraordinary ray (E) is affected by the spatial shift effect from the rutile crystal (3). Thus, isolation in the reverse direction is achieved for the optical signal (B).

With such a polarization-independent multifiber optical isolator (40) according to the fourth embodiment of the present invention, operational effects similar to the polarization-independent multifiber optical isolator (30) according to the above third embodiment can also be obtained.

Furthermore, with this polarization-independent multifiber optical isolator (40) according to this embodiment, the end face (42a) of the optical fiber array (42) is inclined at an angle of 8 degrees to a plane that is perpendicular to the optical axes of the optical fibers (10-13), and the optical input/output end faces (3a, 3b, 5a, 5b) of the rutile crystal (3) and the half-wave plate (5) and the end face (26a) of the focusing rod lens (26) facing the half-wave plate (5), are arranged and formed substantially parallel with the end face (42a) of the optical fiber array (42). Thus, the reflected light, which is generated when the input optical signal (A) or the input optical signal (B) that are input from the optical fibers (10-13) and the reflected optical signal (A) or the reflected optical signal (B) that are input optical signals (A, B) reflected by the total reflecting mirror (9) are reflected by the optical input/output end faces (3a, 3b, 5a, 5b) of the rutile crystal (3) and the half-wave plate (5) and the end face (26a) of the focusing rod lens (26) facing the half-wave plate (5), will not return to its original propagation direction and will not be input into the input optical fibers (10-13) being the output source. Thus, the effects of reflected light will be reduced, which is generated when the input optical signals (A, B) that are input from the optical fibers (10-13) and the reflected optical signals (A, B) that are reflected by the total reflecting mirror (9) are reflected by the end faces (3a, 3b, 5a, 5b and 26a). Therefore, reflected light will be less frequently input into the optical equipment connected to the optical fibers (10-13), and reflected light will not become a noise in the optical equipment when the optical signal propagates in the forward direction.

It should be noted that, although cases were described in the above third and fourth embodiments where two pairs of optical fibers (10, 11) and optical fibers (12, 13) are arranged in parallel with optical fiber array (32) or optical fiber array (42), the present invention is not limited to these cases, and the number of pairs of optical fibers can be selected as needed as shown below.

Figure 17:
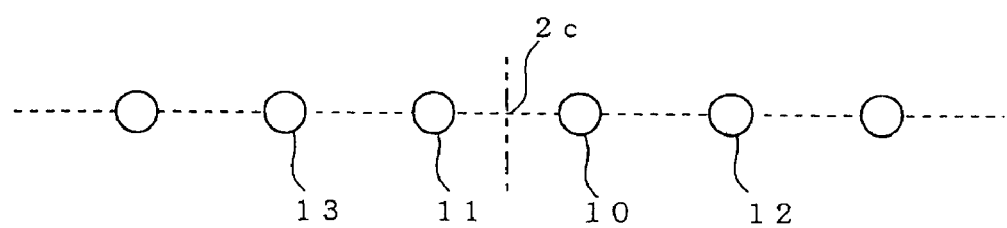
FIG. 17 is a sectional view of an optical fiber array in an in-line optical isolator according to a modified example of the present invention.
Figure 17:
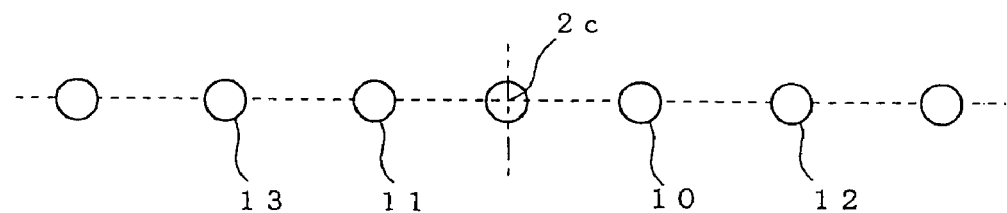

FIG. 17 is a sectional view of the optical fiber array (2), in which the input optical fibers (10, 12 . . . ) and the output fibers (11, 13 . . . ) are fixed by capillaries, i.e. capillary-like holes, opened in the array body at equal intervals in the same plane, cut by a plane that is perpendicular to the optical axes of the optical fibers (10-13). FIG. 17(a) shows a case where a total of 2n (n≧2) number of optical fibers, in n number of pairs, are arranged so that n number of optical fibers are on each side of a center line (2c), with the center line between the optical fibers (10, 11) as the center line (2c). FIG. 17(b) shows a case where a total of 2n (n≧2) number of optical fibers, in n number of pairs, are similarly arranged so that n number of optical fibers are on each side of a center line (2c), with the optical axis of one of the optical fibers as the center line (2c). Optical fiber array (2) is configured with input optical fibers (10, 12 . . . ) and output fibers (11, 13 . . . ) inserted in capillaries opened in the array body or, with input optical fibers (10, 12 . . . ) and output fibers (11, 13 . . . ) placed and fixed in V-shaped grooves that are fabricated in the array body by cutting work.

According to this configuration, the intervals between n number of pairs of input optical fibers (10, 12 . . . ) and output fibers (11, 13 . . . ) are equal to the distance between the two optical fibers that are symmetrically arranged with one of the optical fibers in the optical fiber array (2) as the center line (2c), or the distance between the two optical fibers that are symmetrically arranged with the center line between the two optical fibers (10, 11) as the center line (2c). Therefore, the intervals between the pairs of input optical fibers (10, 12 . . . ) and output fibers (11, 13 . . . ) can be selected according to the usage of the polarization-independent multifiber optical isolators (30, 40) or the available space. Also, the polarization-independent multifiber optical isolators (30, 40) are connected to multiple optical fibers that comprise optical signal paths through optical fibers aligned in capillaries or V-shaped grooves in the array body. Thus, the polarization-independent multifiber optical isolators (30, 40) can be easily connected to multiple optical fibers that comprise optical signal paths. Also, polarization-independent multifiber optical isolators (30, 40) with different number of signal paths can be easily configured by only replacing the optical fiber array (2) with one that has a different number of optical fibers.

Also, cases were described in the above third and fourth embodiments where one of the pairs of input optical fiber (10) and output optical fiber (11) and the other pair of input optical fiber (12) and output optical fiber (13) are arranged in parallel in the same plane. However, these pairs of the optical fibers (10-13) do not necessarily have to be in the same plane, and one of the pairs of input optical fiber (10) and output optical fiber (11) and the other pair of input optical fiber (12) and output optical fiber (13) may be arranged in different planes. Also, optical fibers (10-13) do not necessarily have to be arranged at equal intervals, as long as each input optical fiber and each output optical fiber to be paired are at an equal distance from the center line (2c) of optical fiber array (2).

Also, although cases were described in the above third and fourth embodiments where a half-wave plate (5) was arranged on the side that optical signal (A) output from optical fiber (10) and optical signal (B) output from optical fiber (12) passed through, the half-wave plate (5) may also be arranged on the side that reflected optical signal (A) and reflected optical signal (B) reflected by the total reflecting mirror (9) passes through, as described above. Furthermore, it is also possible to use, in place of a quartz glass plate (4) and paired with a half-wave plate (5), a medium that does not rotate the polarizing direction.

Also, although cases were described in the above third and fourth embodiments where magnetized garnet crystal (8) was used as a non-reciprocal polarization plane rotating device, other media may be used as long as it is a non-reciprocal polarization plane rotating device that rotates the polarizing direction by 22.5 degrees at the optical signal wavelength to be used. For example, it is possible to employ a configuration in which a non-reciprocal polarization plane rotating device is covered by a magnetic substance, i.e. provide a magnet on the outside of a non-magnetized, non-reciprocal polarization plane rotating device to apply a predetermined magnetic field to the device. Also, although focusing rod lens (6, 26) of diffraction distribution type was used a light collecting means, many different light collecting means can be used in cases where optical signal (A) and optical signal (B) input from the optical fibers (10-13) are separated by the rutile crystal (3) into ordinary ray (O) and extraordinary ray (E), as long as crystal optical axis (3c) of rutile crystal (3) is oriented so that the separation directions of the ordinary ray (O) and the extraordinary ray (E) intersect perpendicularly with a plane including the optical axes of the optical fibers (10-13) and the ordinary ray (O) and the extraordinary ray (E) are each arranged at a substantially equal distance from the center optical axes of the lens.

Also, although a case was described in the above fourth embodiment where the end face (42a) of the optical fiber array (42), optical input/output end faces (3a, 3b, 4a, 4b, 5a, 5b) of the rutile crystal (3), the quartz glass plate (4) and the half-wave plate (5) and the end face (26a) of the focusing rod lens (26) are arranged at an angle of 8 degrees with respect to a plane that is perpendicular to the optical axes of the optical fibers (10, 11, 12, 13), these end faces may also be arranged at an angle between 3 degrees and 16 degrees.

In each of the above cases, operational effects similar to each of the above embodiments can be also obtained.

POSSIBLE INDUSTRIAL USE

It should be noted that, although cases were described in each of the above embodiments where an in-line optical isolator is applied to optical communication systems, the present invention is not limited to these cases, and it is also possible to apply it to optical sensor systems. In such cases, operational effects similar to each of the above embodiments can be also obtained.

What is claimed is:

1. An in-line optical isolator comprising:
a plurality of individual pairs of an input optical fiber for inputting a forward optical signal in a forward direction and an output optical fiber for outputting a forward optical signal in a reflection direction that is input from the input optical fiber;
a birefringent crystal positioned next to said input fibers and said output fibers for separating said forward optical signals in the forward direction into ordinary rays and extraordinary rays and combining said ordinary rays and said extraordinary rays in the reflection direction into said forward optical signals;
a half-wave plate positioned next to said birefringent crystal and provided along either the optical axes of said ordinary rays and said extraordinary rays of said forward optical signals in the forward direction or the optical axes of said ordinary rays and said extraordinary rays of said forward optical signals in the reflection direction and rotating the polarization directions of said ordinary rays and said extraordinary rays reciprocally;
a lens positioned next to said half-wave plate for collimating said ordinary rays and said extraordinary rays in the forward direction and collecting said ordinary rays and extraordinary rays in the reflection direction;
a Faraday rotator positioned next to said lens for rotating the polarization directions of said ordinary rays and said extraordinary rays in both the forward direction and the reflection direction non-reciprocally; and
a reflector positioned next to said Faraday rotator for reflecting said ordinary rays and said extraordinary rays from the forward direction to the reflection direction,
wherein the optical axis of said birefringent crystal is oriented so that the separation direction of said ordinary rays and said extraordinary rays are arranged in a plane that is perpendicular to a plane including the optical axes of said input optical fibers and said output optical fibers and
the optical axes of said ordinary rays and extraordinary rays of the forward optical signals in the forward direction and the ordinary rays and extraordinary rays of the forward optical signals in the reflection direction are arranged at an equal distance within each of these four rays from the optical axis of said lens at each point between said lens and said reflector.

2. An in-line optical isolator of claim 1, wherein an air gap is provided between said lens and said Faraday rotator and an organic adhesive is not provided in optical paths between said lens and said reflector.

3. An in-line optical isolator of claim 1, wherein said Faraday rotator is magnetized and magnetically sealed.

* * * * *